United States Patent
Yokoyama et al.

(10) Patent No.: US 10,724,114 B2
(45) Date of Patent: Jul. 28, 2020

(54) HIGH-STRENGTH COLD-ROLLED STEEL SHEET, HIGH-STRENGTH HOT-DIP GALVANIZED STEEL SHEET AND HIGH-STRENGTH GALVANNEALED STEEL SHEET

(71) Applicant: NIPPON STEEL & SUMITOMO METAL CORPORATION, Tokyo (JP)

(72) Inventors: Takafumi Yokoyama, Tokyo (JP); Hiroyuki Kawata, Tokyo (JP); Riki Okamoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 286 days.

(21) Appl. No.: 15/740,055

(22) PCT Filed: Jun. 29, 2016

(86) PCT No.: PCT/JP2016/069344
§ 371 (c)(1),
(2) Date: Dec. 27, 2017

(87) PCT Pub. No.: WO2017/002883
PCT Pub. Date: May 1, 2017

(65) Prior Publication Data
US 2018/0202016 A1   Jul. 19, 2018

(30) Foreign Application Priority Data

Jun. 30, 2015 (JP) ................................. 2015-131206
Jun. 30, 2015 (JP) ................................. 2015-131207

(51) Int. Cl.
*C21D 9/46* (2006.01)
*C22C 38/60* (2006.01)
(Continued)

(52) U.S. Cl.
CPC .............. *C21D 9/46* (2013.01); *B32B 15/013* (2013.01); *B32B 15/18* (2013.01); *C21D 8/0205* (2013.01);
(Continued)

(58) Field of Classification Search
CPC . B32B 15/013; B32B 15/18; C21D 2211/001; C22C 38/00; C23C 2/02; C23C 2/40; C23F 17/00
(Continued)

(56) References Cited

U.S. PATENT DOCUMENTS

2019/0169729 A1* 6/2019 Yokoyama .............. C22C 38/28

FOREIGN PATENT DOCUMENTS

CN       101514427        8/2009
CN       101932742       12/2010
(Continued)

OTHER PUBLICATIONS

NPL: on-line translation of JP-2009108343A, May 2009 (Year: 2009).*
(Continued)

*Primary Examiner* — Jie Yang
(74) *Attorney, Agent, or Firm* — Clark & Brody LP

(57) ABSTRACT

A high-strength cold-rolled steel sheet is provided that has a chemical composition that consists of, by mass %, C: 0.050 to 0.40%, Si: 0.01 to 3.0%, Mn: 1.0 to 5.0%, sol. Al: 0.001 to 1.0%, Ti: 0.005 to 0.20%, B: 0.0005 to 0.010%, P: 0.1% or less, S: 0.01% or less, O: 0.1% or less, N: 0.01% or less, Cr: 0 to 1.0%, Mo: 0 to 1.0%, Ni: 0 to 1.0%, Cu: 0 to 1.0%, Sn: 0 to 0.50%, Nb: 0 to 0.20%, V: 0 to 0.50%, W: 0 to 0.50%, Ca: 0 to 0.01%, Mg: 0 to 0.01%, Bi: 0 to 0.01%, Sb: 0 to 0.10%, Zr: 0 to 0.01%, and REM: 0 to 0.01%, with the balance being Fe and impurities, and that satisfies the formulas [sol. Bs/B≤0.50] and [sol. Bq/B>0.50] (where, B:
(Continued)

D: Distance from nozzle to steel sheet
θ: Angle between nozzle and sheet thickness direction of steel sheet B amount in the steel; sol. Bs: soluble B amount in a surface layer portion of the steel; and sol. Bq: soluble B amount in the steel interior).

9 Claims, 1 Drawing Sheet

(51) Int. Cl.
| | |
|---|---|
| C22C 38/00 | (2006.01) |
| C22C 38/32 | (2006.01) |
| C23C 2/02 | (2006.01) |
| C22C 38/26 | (2006.01) |
| C22C 38/22 | (2006.01) |
| B32B 15/01 | (2006.01) |
| B32B 15/18 | (2006.01) |
| C21D 8/02 | (2006.01) |
| C22C 38/02 | (2006.01) |
| C22C 38/04 | (2006.01) |
| C22C 38/06 | (2006.01) |
| C22C 38/08 | (2006.01) |
| C22C 38/12 | (2006.01) |
| C22C 38/14 | (2006.01) |
| C22C 38/16 | (2006.01) |
| C22C 38/28 | (2006.01) |
| C22C 38/38 | (2006.01) |
| C23C 2/06 | (2006.01) |
| C23C 2/28 | (2006.01) |
| C23C 2/40 | (2006.01) |
| C23F 17/00 | (2006.01) |

(52) U.S. Cl.
CPC .......... *C21D 8/0226* (2013.01); *C21D 8/0236* (2013.01); *C21D 8/0278* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/22* (2013.01); *C22C 38/26* (2013.01); *C22C 38/28* (2013.01); *C22C 38/32* (2013.01); *C22C 38/38* (2013.01); *C22C 38/60* (2013.01); *C23C 2/02* (2013.01); *C23C 2/06* (2013.01); *C23C 2/28* (2013.01); *C23C 2/40* (2013.01); *C23F 17/00* (2013.01); *C21D 2211/001* (2013.01); *C21D 2211/002* (2013.01); *C21D 2211/005* (2013.01); *C21D 2211/008* (2013.01)

(58) Field of Classification Search
USPC ........................................................ 148/330
See application file for complete search history.

(56) References Cited

FOREIGN PATENT DOCUMENTS

| | | |
|---|---|---|
| CN | 101960034 | 1/2011 |
| CN | 102149840 | 8/2011 |
| CN | 102414335 | 4/2012 |
| CN | 102712980 | 10/2012 |
| CN | 103781932 | 5/2014 |
| CN | 104195443 | 12/2014 |
| CN | 104736736 | 6/2015 |
| EP | 2 098 600 | 9/2009 |
| EP | 2 233 597 | 9/2010 |
| EP | 2 256 224 | 12/2010 |
| JP | 56-44723 | 4/1981 |
| JP | 04-280917 | 10/1992 |
| JP | 05-195149 | 8/1993 |
| JP | 05-311326 | 11/1993 |
| JP | 10-088277 | 4/1998 |
| JP | 10-130782 | 5/1998 |
| JP | 2005-273002 | 10/2005 |
| JP | 2009-108343 | 5/2009 |
| JP | 2014-237887 | 12/2014 |
| KR | 10-2010-0112657 | 10/2010 |
| TW | 201213558 | 4/2012 |
| TW | 201247896 | 12/2012 |
| WO | 2010/106748 | 9/2010 |

OTHER PUBLICATIONS

Hirofumi Kurayasu et al., "Determination of Boron in Steels and in the Precipitates Using Sulfuric Acid Containing Ammonium Sulfate and Phase Analysis of Boron in Steels", Iron and Steel, vol. 74, 1988, p. 2353.

* cited by examiner

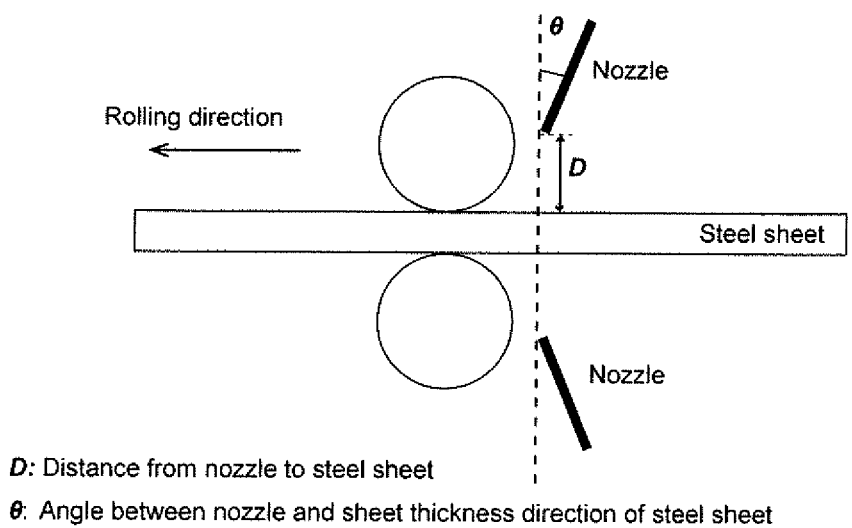
D: Distance from nozzle to steel sheet
θ: Angle between nozzle and sheet thickness direction of steel sheet

HIGH-STRENGTH COLD-ROLLED STEEL SHEET, HIGH-STRENGTH HOT-DIP GALVANIZED STEEL SHEET AND HIGH-STRENGTH GALVANNEALED STEEL SHEET

TECHNICAL FIELD

The present invention relates to a high-strength cold-rolled steel sheet, a high-strength hot-dip galvanized steel sheet and a high-strength galvannealed steel sheet.

BACKGROUND ART

In recent years, from the viewpoint of complying with greenhouse gas emissions regulations in association with measures to tackle global warming, reductions in the weight of automobile bodies are being sought with the aim of improving the fuel consumption of automobiles. In addition, because it is necessary to ensure collision safety, the application of high-strength steel sheets is increasing. In particular, recently there is an increasing need for ultra-high strength steel sheets having a tensile strength of 980 MPa or more, preferably 1180 MPa or more. Further, there is a demand for an ultra-high strength hot-dip galvanized steel sheet whose surface has undergone hot-dip galvanization for use at regions in an automobile body that require rust preventing properties.

One of methods for forming vehicles or members of automobiles using such high-strength steel sheets is a bending method, such as press forming. In general, the bendability tends to deteriorate as the strength of a steel sheet is increased. Therefore, there has been a problem in that when a high-strength steel sheet is subjected to bending, fissures (cracks) occur within the steel sheet at a deformed part.

It is known that (a) the degree of difficulty for necking to occur, and (b) the degree of difficulty for cracking (voids) to occur inside the steel sheet are important as factors that govern the bendability of a high-strength steel sheet. It is considered that this is because, in a steel sheet having a low degree of elongation, necking occurs during bending and deformations are localized, and consequently the bendability deteriorates.

During bending of a steel sheet, a large tensile strain in the circumferential direction arises at a surface layer portion of a bent outer peripheral surface, and a large compressive strain arises at a surface layer portion of a bent inner peripheral surface. Therefore, the bendability of an ultra-high strength steel sheet is significantly affected not only by the steel micro-structure inside the steel sheet, but also by the steel micro-structure of the surface layer portion of the steel sheet. Specifically, it is known that by making the surface layer portion of the steel sheet a soft layer, localization of deformations that arise in the steel sheet surface during bending is lessened and bendability is improved. Patent Documents 1 to 4, that are described hereunder, disclose inventions in which the aforementioned technique is applied to improve the bendability of an ultra-high strength steel sheet.

Patent Document 1 discloses technology that relates to a hot-dip galvanized steel sheet or a galvannealed steel sheet having a tensile strength of 1180 MPa or more in which the bendability is improved by dissolving Zn in a surface layer portion of the steel sheet and softening the surface layer portion of the steel sheet, and furthermore, making the metal micro-structure constituting the steel sheet a micro-structure that mainly consists of martensite and bainite.

Patent Documents 2 and 3 disclose technology relating to an ultra-high strength cold-rolled steel sheet that, by controlling the atmosphere during continuous annealing to an oxidizing atmosphere to cause a decarburized layer to form on an outer layer of a steel sheet, improves the bendability by separately forming a soft layer that mainly consists of ferrite as the outer layer and a hard layer that mainly consists of martensite and bainite as an inner layer.

Patent Document 4 discloses technology relating to a high-strength cold-rolled steel sheet that, after heating a steel sheet, sprays water onto the surface to cool a surface layer portion and thereafter uniformly cools from the outer layer of the steel sheet to the interior to thereby vary the cooling patterns for the surface layer portion and the interior of the steel sheet and separately form a soft layer that mainly consists of ferrite in the outer layer and a hard layer that mainly consists of a low-temperature transformation phase in an inner layer to thus improve the bendability.

LIST OF PRIOR ART DOCUMENTS

Patent Documents

Patent Document 1: JP2014-237887A
Patent Document 2: JP10-130782A
Patent Document 3: JP5-195149A
Patent Document 4: JP2005-273002A Non Patent Document Non-Patent Document 1: Tetsu-to-Hagane (Iron and Steel), vol. 74, 1988, p. 2353

SUMMARY OF INVENTION

Technical Problem

As described above, attempts have been made heretofore to improve bendability by controlling the hardness and the micro-structure of the outer layer of a steel sheet and the inner layer of the steel sheet, respectively.

However, according to the technology described in Patent Document 1, in order to cause Zn to dissolve in a surface layer portion of a steel sheet, it is necessary to make the heating temperature when annealing a high temperature of the $Ac_3$ point+50° C. or more. This is not preferable since it hastens the occurrence of damage to the furnace body of the continuous annealing furnace.

Further, according to the technology disclosed in Patent Documents 2 and 3, the atmosphere during annealing is made an oxidizing atmosphere for the purpose of decarburization, and an internal oxidized layer of an alloying element such as Mn and Si is formed in the outer layer of the steel sheet. Because of the existence of the internal oxidized layer, in some cases the fatigue strength decreases significantly, and consequently room for improvement still remains.

In addition, according to the technology disclosed in Patent Document 4, since it is necessary to perform water spraying onto the surface of a cast piece, there is a problem in that it is difficult to apply the technology to heat treatment on a hot-dip galvanization line.

As described in the foregoing, studies and development have been carried out with the object of improving bendability by various techniques with respect to high-strength steel sheets. However, technology that maintains the strength while also improving the bendability has not yet been established, and furthermore when the bendability of a high-strength hot-dip galvanized steel sheet is also taken into consideration, the studies performed in the conventional technology have been inadequate.

An objective of the present invention is to solve the aforementioned problems and provide a high-strength cold-rolled steel sheet, a high-strength hot-dip galvanized steel sheet and a high-strength galvannealed steel sheet that are excellent in bendability.

Solution to Problem

The present invention was conceived to solve the issues described above, and the gist of the present invention is a high-strength cold-rolled steel sheet, a high-strength hot-dip galvanized steel sheet, and a high-strength galvannealed steel sheet which are described hereunder.

(1) A high-strength cold-rolled steel sheet, having a chemical composition consisting of, by mass %,
C: 0.050 to 0.40%,
Si: 0.01 to 3.0%,
Mn: 1.0 to 5.0%,
sol. Al: 0.001 to 1.0%,
Ti: 0.005 to 0.20%,
B: 0.0005 to 0.010%,
P: 0.1% or less,
S: 0.01% or less,
O: 0.1% or less,
N: 0.01% or less,
Cr: 0 to 1.0%,
Mo: 0 to 1.0%,
Ni: 0 to 1.0%,
Cu: 0 to 1.0%,
Sn: 0 to 0.50%,
Nb: 0 to 0.20%,
V: 0 to 0.50%,
W: 0 to 0.50%,
Ca: 0 to 0.01%,
Mg: 0 to 0.01%,
Bi: 0 to 0.01%,
Sb: 0 to 0.10%,
Zr: 0 to 0.01%,
REM: 0 to 0.01%, and
the balance: Fe and impurities,
and satisfying formula (i) and formula (ii) below:

$$\text{sol. Bs/B} \leq 0.50 \quad \text{(i)}$$

$$\text{sol. Bq/B} > 0.50 \quad \text{(ii)}$$

where, the meaning of each symbol in the above formulas is as follows:
B: B content (mass %) contained in steel sheet;
sol. Bs: B content (mass %) present as a solid solution from a surface down to a depth of 30 rpm of the steel sheet; and
sol. Bq: B content (mass %) present as a solid solution at a position of ¼ thickness of the steel sheet.

(2) The high-strength cold-rolled steel sheet according to (1), wherein the chemical composition contains, by mass %, one or more elements selected from:
Cr: 0.001 to 1.0%,
Mo: 0.001 to 1.0%,
Ni: 0.001 to 1.0%,
Cu: 0.001 to 1.0%, and
Sn: 0.001 to 0.50%.

(3) The high-strength cold-rolled steel sheet according to (1) or (2), wherein the chemical composition contains, by mass %, one or more elements selected from:

Nb: 0.001 to 0.20%,
V: 0.001 to 0.50%, and
W: 0.001 to 0.50%.

(4) The high-strength cold-rolled steel sheet according to any one of (1) to (3), wherein the chemical composition contains, by mass %, one or more elements selected from:
Ca: 0.0001 to 0.01%,
Mg: 0.0001 to 0.01%,
Bi: 0.0001 to 0.01%,
Sb: 0.0001 to 0.10%,
Zr: 0.0001 to 0.01%, and
REM: 0.0001 to 0.01%.

(5) The high-strength cold-rolled steel sheet according to any one of (1) to (4), wherein:
a steel micro-structure at a position from a surface down to a depth of 30 μm of the steel sheet is, in area %:
polygonal ferrite: 10 to 95%, and
the balance: one or more kinds selected from martensite, bainite and retained austenite,
with a proportion of tempered martensite to the martensite overall being 50% or more; and
a steel micro-structure at a position of ¼ thickness of the steel sheet is, in area %:
polygonal ferrite: 60% or less, and
the balance: one or more kinds selected from martensite, bainite and retained austenite,
with a proportion of tempered martensite to the martensite overall being 50% or more.

(6) The high-strength cold-rolled steel sheet according to (5), wherein:
a steel micro-structure at a position from the surface down to the depth of 30 μm of the steel sheet is, in area %:
polygonal ferrite: 30 to 95%; and
a steel micro-structure at the position of ¼ thickness of the steel sheet is, in area %:
polygonal ferrite: 10 to 60%.

(7) The high-strength cold-rolled steel sheet according to (5), wherein:
a steel micro-structure at a position from the surface down to the depth of 30 μm of the steel sheet is, in area %:
polygonal ferrite: 10 to 80%, and
a steel micro-structure at the position of ¼ thickness of the steel sheet is, in area %:
polygonal ferrite: 20% or less,
martensite: 50% or more,
bainite: 40% or less, and
retained austenite: 20% or less.

(8) The high-strength cold-rolled steel sheet according to (6), wherein:
a tensile strength is 980 MPa or more, and a ratio R/t between a sheet thickness t and a minimum bending radius R is 2.5 or less.

(9) The high-strength cold-rolled steel sheet according to (7), wherein:
a tensile strength is 1180 MPa or more, and a ratio R/t between a sheet thickness t and a minimum bending radius R is 3.5 or less.

(10) A high-strength hot-dip galvanized steel sheet that has a hot-dip galvanized layer on a surface of a high-strength cold-rolled steel sheet according to any one of (1) to (9).

(11) A high-strength galvannealed steel sheet that has a galvannealed layer on a surface of a high-strength cold-rolled steel sheet according to any one of (1) to (9).

Advantageous Effects of Invention

According to the present invention, a high-strength cold-rolled steel sheet, a high-strength hot-dip galvanized steel sheet, and a high-strength galvannealed steel sheet that are excellent in bendability can be obtained.

BRIEF DESCRIPTION OF DRAWINGS

FIG. 1 is a view for describing the positional relationship between a nozzle and a steel sheet during a descaling process.

DESCRIPTION OF EMBODIMENTS

The present inventors conducted intensive studies in order to obtain a high-strength cold-rolled steel sheet that is excellent in bendability. As a result, the present inventors discovered that the bendability of a steel sheet can be improved without lowering the strength of the steel sheet by controlling how B, which is a hardenability element, is present to mainly a precipitation state in a surface layer portion of the steel sheet and to mainly a solid solution in the interior of the steel sheet.

Specifically, the present inventors discovered that it is possible to suppress the occurrence of a deterioration in the strength and to improve the bendability by making a ratio between the B amount that is present as a solid solution and the total B amount contained in the steel 0.50 or less from the steel sheet surface down to a depth of 30 μm (in the following description, this area is also referred to as a "surface layer portion"), and making the aforementioned ratio more than 0.50 at a position of ¼ thickness of the steel sheet (in the following description, this position is also referred to "interior").

The present inventors discovered that in order to control the presence state of B so as to satisfy the aforementioned conditions, it is effective to make the scale thickness immediately after coiling of a hot-rolled coil a thickness that is within a predetermined range, and to adjust the cooling conditions after coiling the hot-rolled coil.

The present invention has been made based on the above findings. The respective requirements of the present invention are described in detail hereunder.

(A) Chemical Composition

The reasons for limiting each element are as follows. Note that, the symbol "%" with respect to content in the following description represents "mass percent".

C: 0.050 to 0.40%

C (carbon) is an essential element for providing the steel sheet with high strength. On the other hand, if an excessive amount of C is contained, it will cause the bendability, press-formability and weldability to deteriorate. Therefore, the C content is made 0.050 to 0.40%. From the viewpoint of increasing the strength, preferably the C content is made 0.080% or more. Further, from the viewpoint of suppressing a deterioration in the press-formability and weldability, preferably the C content is made 0.25% or less.

Si: 0.01 to 3.0%

Si (silicon) is a solid-solution strengthening element, and is an effective element for providing the steel sheet with high strength. On the other hand, if an excessive amount of Si is contained, not only will the chemical treatability of the steel sheet and the wettability with respect to hot-dip galvanization be noticeably deteriorated, it will also cause the bendability to deteriorate. Therefore, the Si content is made 0.01% to 3.0%. From the viewpoint of increasing the strength, preferably the Si content is made 0.10% or more, and more preferably is made 0.20% or more. Further, from the viewpoint of suppressing deterioration of the chemical treatability and the wettability with respect to hot-dip galvanization, preferably the Si content is made 2.0% or less, and more preferably is made 1.50% or less.

Mn: 1.0 to 5.0%

Mn (manganese) is a powerful austenite stabilizing element, and is an effective element for improving the hardenability of the steel sheet. On the other hand, if an excessive amount of Mn is contained, it will cause the bendability, weldability and low-temperature toughness to deteriorate. Therefore, the Mn content is made 1.0 to 5.0%. From the viewpoint of enhancing the hardenability, preferably the Mn content is made 1.5% or more. Further, from the viewpoint of suppressing deterioration of the weldability and low-temperature toughness, preferably the Mn content is made 3.0% or less.

sol. Al: 0.001 to 1.0%

Al (aluminum) is contained in an amount of at least 0.001% for deoxidation of the steel. However, if Al is contained in an excessive amount, the effect is saturated, and the excessive amount not only leads to an increase in the cost but also raises the transformation temperature of the steel and increases the load during hot rolling. Therefore, the sol. Al content is made 1.0% or less. Preferably the sol. Al content is made 0.005% or more, and is preferably made 0.5% or less.

Ti: 0.005 to 0.20%

Ti (titanium) immobilizes N as TiN in the steel to thereby suppress formation of BN that becomes a factor that reduces hardenability. Further, Ti refines the austenite grain size during heating to enhance toughness. On the other hand, if Ti is contained in an excessive amount, the ductility of the steel sheet decreases. Therefore, the Ti content is made 0.005 to 0.20%. The Ti content is preferably made 0.010% or more, and is preferably made 0.050% or less.

B: 0.0005 to 0.010%

B (boron) segregates at austenite grain boundaries or ferrite/austenite grain boundaries when heating the steel sheet and stabilizes the grain boundaries to thereby enhance the hardenability of the steel, and therefore B is an essential element in the present invention. On the other hand, if an excessive amount of B is contained, it will result in the loss of hardenability of the steel due to the formation of borides. Therefore, the B content is made 0.0005 to 0.010%. The B content is preferably made 0.0010% or more, and is preferably made 0.0050% or less.

P: 0.1% or less

P (phosphorus) is a solid-solution strengthening element, and is an effective element for enhancing the strength of the steel sheet. However, if an excessive amount of P is contained, the weldability and toughness are caused to deteriorate. Therefore, the P content is made 0.1% or less. More preferably, the P content is made 0.05% or less. However, if the P content is reduced extremely, the dephosphorization cost will be high, and therefore from the viewpoint of economic efficiency it is preferable to make the lower limit 0.001%.

S: 0.01% or less

S (sulfur) is an element contained as an impurity, and forms MnS in the steel and deteriorates the toughness and hole expandability. Therefore, as a range that does not cause a noticeable deterioration in toughness and hole expandability, the S content is made 0.01% or less. The S content is preferably made 0.005% or less, and more preferably 0.002% or less. However, because the desulfurization cost will be high if the S content is reduced extremely, from the viewpoint of economic efficiency it is preferable to make the lower limit 0.0005%.

O: 0.1% or less

O (oxygen) is an element contained as an impurity. If the content of O is more than 0.1%, the O forms coarse oxides in the steel and deteriorates bendability and hole expandability. Therefore, the O content is made 0.1% or less. The O content is preferably made 0.01% or less, and more preferably 0.005% or less. However, from the viewpoint of the production cost, the lower limit of the O content is preferably 0.0001%.

N: 0.01% or less

N (nitrogen) is an element contained as an impurity. If the content of N is more than 0.01%, the N forms coarse nitrides in the steel and deteriorates bendability and hole expandability. Therefore, the N content is made 0.01% or less. The N content is preferably made 0.005% or less. However, if the N content is reduced extremely, the denitrification cost will be high, and therefore from the viewpoint of economic efficiency the lower limit is preferably made 0.0005%.

In addition to the elements described above, the high-strength steel sheet of the present invention may contain one or more elements selected from Cr, Mo, Ni, Cu, Sn, Nb, V, W, Ca, Mg, Bi, Sb, Zr and REM in the amounts described hereunder.

Cr: 0 to 1.0%
Mo: 0 to 1.0%
Ni: 0 to 1.0%
Cu: 0 to 1.0%
Sn: 0 to 0.50%

Cr (chromium), Mo (molybdenum), Ni (nickel), Cu (copper) and Sn (tin) are each an effective element for enhancing the strength of the steel sheet, and may therefore be contained according to need. However, if any of these elements is contained in an excessive amount, the effect is saturated and it results in an increase in cost. Therefore, the content of each of Cr, Mo, Ni and Cu is made 1.0% or less, and the Sn content is made 0.50% or less. The content of each of Cr, Mo, Ni and Cu is preferably made 0.60% or less, and the Sn content is preferably made 0.30% or less.

To obtain the aforementioned effect, preferably one or more elements selected from Cr, Mo, Ni, Cu and Sn is contained in an amount of 0.001% or more, and more preferably in an amount of 0.05% or more.

Nb: 0 to 0.20%
V: 0 to 0.50%
W: 0 to 0.50%

Nb (niobium), V (vanadium) and W (tungsten) are carbide-forming elements and are effective elements for enhancing the strength of the steel sheet, and may therefore be contained according to need. However, if any of these elements is contained in an excessive amount, the effect is saturated and it results in an increase in cost. Therefore, the Nb content is made 0.20% or less, and the content of V and the content of W are each made 0.50% or less. The Nb content is preferably made 0.10% or less, and the content of V and the content of W are each preferably made 0.30% or less.

To obtain the aforementioned effect, preferably one or more elements selected from Nb, V and W is contained in an amount of 0.001% or more, and more preferably in an amount of 0.005% or more.

Ca: 0 to 0.01%
Mg: 0 to 0.01%
Bi: 0 to 0.01%
Sb: 0 to 0.10%
Zr: 0 to 0.01%
REM: 0 to 0.01%

Ca (calcium), Mg (magnesium), Sb (antimony), Zr (zirconium) and REM (rare earth metal) are elements that contribute to finely dispersing inclusions in the steel, and Bi (bismuth) is an element that reduces micro-segregation of substitutional alloying elements such as Mn and Si in the steel. Because these elements each contribute to improving the bendability of the steel sheet, the respective elements may be contained according to need. However, if an excessive amount of these elements is contained, the elements will cause the ductility to deteriorate. Therefore, the content of each of Ca, Mg, Bi, Zr and REM is made 0.01% or less, and the Sb content is made 0.10% or less. The content of each of Ca, Mg, Bi, Zr and REM is preferably made 0.006% or less, and the Sb content is preferably made 0.080% or less.

To obtain the aforementioned effects, preferably one or more elements selected from Ca, Mg, Bi, Sb, Zr and REM is contained in an amount of 0.0001% or more, and more preferably in an amount of 0.0010% or more.

In the present invention, the term "REM" refers to a total of 17 elements that are Sc, Y and the lanthanoids, and the aforementioned content of REM means the total content of these elements. Note that, in industrial use the lanthanoids are added in the form of misch metal.

In the chemical composition of the steel sheet of the present invention, the balance is Fe and impurities.

In this case, the term "impurities" refers to components which, during industrial production of the steel sheet, are mixed in from raw material such as ore or scrap or due to various factors in the production process, and which are allowed within a range that does not adversely affect the present invention.

(B) Presence state of B

As described above, in the present invention, in order to improve bendability without lowering the strength of the steel sheet, it is necessary to control the presence state of B, which is a hardenability element, so as to satisfy the following formulas (i) and (ii).

$$\text{sol. Bs}/B \leq 0.50 \tag{i}$$

$$\text{sol. Bq}/B > 0.50 \tag{ii}$$

Where, the meaning of each symbol in the above formulas is as follows:

B: B content (mass %) contained in the steel sheet, sol. Bs: B content (mass %) present as a solid solution from the surface down to a depth of 30 µm of the steel sheet, and sol. Bq: B content (mass %) present as a solid solution at a position of ¼ thickness of the steel sheet.

It is important that B is caused to be present in mainly a precipitation state in a surface layer portion of the steel sheet. If the value of sol. Bs/B is more than 0.50, the hardenability of the surface layer portion will increase excessively and it will therefore not be possible to ensure bendability. The value of sol. Bs/B is preferably made 0.30 or less, and more preferably is made 0.20 or less.

On the other hand, in the steel sheet interior, it is important that B is caused to be present as mainly a solid solution. If the value of sol. Bq/B is 0.50 or less, the hardenability of the steel sheet interior will decrease and it will therefore not be possible to secure the required strength. The value of sol. Bq/B is preferably made 0.65 or more, and is more preferably made 0.80 or more.

Note that, the values of sol. Bs and sol. Bq are determined by calculating, at the respective predetermined positions thereof, the B amount consumed as a precipitate by measuring the mass of boride in the steel by an electrolytic extraction residue method, and thereafter deducting the calculated B amount from the B content contained in the steel.

Specifically, with regard to the content of B that is present as a boride from the surface down to a depth of 30 μm of the steel sheet, the value is measured by electrolytic extraction to a depth of 30 μm without grinding the steel sheet surface. Further, with regard to the content of B that is present as a boride at a position of ¼ thickness of the steel sheet, the value is measured by mechanically grinding the steel sheet to the position of ¼ thickness, and thereafter performing electrolytic extraction to a depth of 30 μm. Note that, a technique disclosed in Non-Patent Document 1 is used as a method for determining the precipitated B amount by the extraction residue method.

(C) Steel Micro-Structure

The steel micro-structure of the steel sheet of the present invention will now be described. Note that, in the following description, the symbol "%" means "area %".

Although limitations are not particularly set with respect to the steel micro-structure of the steel sheet of the present invention, in order to compatibly achieve both strength and bendability, it is preferable to adjust the respective steel micro-structures of the surface layer portion and the interior of the steel sheet. Specifically, from the surface down to a depth of 30 μm of the steel sheet, it is preferable to make the area fraction of polygonal ferrite 10 to 95% and to make the balance one or more kinds selected from martensite, bainite and retained austenite, and at a position of ¼ thickness of the steel sheet, it is preferable to make the area fraction of polygonal ferrite 60% or less and to make the balance one or more kinds selected from martensite, bainite and retained austenite.

The aforementioned martensite includes as-quenched martensite and tempered martensite subjected to tempering in addition to quenching. Because as-quenched martensite is brittle in comparison to tempered martensite, it is liable to become the origin of fractures when subjecting the steel sheet to plastic deformation such as bending. Therefore, in order to secure the desired bendability, in each of the surface layer portion and the interior of the steel sheet, it is preferable to make the proportion of tempered martensite to the entire martensite 50% or more, and more preferably 70% or more.

Further, when placing the emphasis on bendability, in addition, it is preferable to make the area fraction of polygonal ferrite in the surface layer portion of the steel sheet 30 to 95% and to make the area fraction of polygonal ferrite in the interior of the steel sheet 10 to 60%. The area fraction of polygonal ferrite in the surface layer portion of the steel sheet is more preferably 50 to 90%, and an area fraction of 70 to 90% is further preferable. Further, the area fraction of polygonal ferrite in the steel sheet interior is more preferably 20 to 40%.

On the other hand, when placing the emphasis on strength, in addition, it is preferable to make the area fraction of polygonal ferrite in the surface layer portion of the steel sheet 10 to 80% and, in the interior of the steel sheet, to make the area fraction of polygonal ferrite 20% or less, to make the area fraction of martensite 50% or more, to make the area fraction of bainite 40% or less, and to make the area fraction of retained austenite 20% or less. The area fraction of polygonal ferrite in the surface layer portion of the steel sheet is more preferably 30% or more, and further preferably is 50% or more. Further, in the steel sheet interior, the area fraction of polygonal ferrite is more preferably less than 10%, and further preferably is less than 5%, and the area fraction of martensite is more preferably 70% or more.

The steel micro-structure in the present invention is measured by the method described hereafter. A section in the rolling direction of the steel sheet is cut out, and the steel micro-structure is revealed by using a nital solution. Thereafter, a position from the surface to a depth of 30 μm and a position of ¼ thickness of the steel sheet are photographed using a scanning electron microscope (magnification: ×5000, 5 visual fields). The area fractions of polygonal ferrite, bainite, martensite and tempered martensite are calculated by the point counting method based on the obtained micro-structure photographs.

Further, with respect to the area fraction of retained austenite, the area fraction is determined by calculating the area of a region having an FCC structure by the EBSP-OIM (Electron Back Scatter Diffraction Pattern-Orientation Image Microscopy) method.

(D) Mechanical Properties

As described above, the steel sheet according to the present invention has both high strength and excellent bendability. Although limitations are not particularly set with respect to the mechanical properties, when placing the emphasis on bendability, preferably the tensile strength is 980 MPa or more and the ratio R/t between the sheet thickness t and the minimum bending radius R is 2.5 or less. On the other hand, when placing the emphasis on strength, preferably the tensile strength is 1180 MPa or more and the ratio R/t between the sheet thickness t and the minimum bending radius R is 3.5 or less. When placing further emphasis on strength, the tensile strength is more preferably 1470 MPa or more.

Note that, the minimum bending radius R is evaluated by a V block method in accordance with a bending test specified in JIS Z 2248. Specifically, a strip specimen in a direction (width direction) orthogonal to the thickness direction and the rolling direction is cut out, the bending radius is varied to perform 90-degree V bending, and the smallest bending radius at which cracking does not occur is taken as the minimum bending radius.

(E) Plated Layer

The high-strength cold-rolled steel sheet according to the present invention described above may have a hot-dip galvanized layer on the steel sheet surface. The corrosion resistance is improved by providing a hot-dip galvanized layer on the steel sheet surface.

Further, the hot-dip galvanized layer may be subjected to alloying. Because Fe is incorporated into the hot-dip galvanized layer by the alloying treatment, the alloyed hot-dip galvanized layer is excellent in weldability and coating properties.

In addition, performing plating of an upper layer on the hot-dip galvanized layer may be performed for the purpose of improving coating properties and weldability. Further, in the high-strength cold-rolled steel sheet of the present invention, various kinds of treatment such as a chromate treatment, a phosphate treatment, a lubricity enhancing treatment, or a weldability enhancing treatment may be performed on the hot-dip galvanized layer.

(F) Production Method

Although there are no particular limitations with respect to the conditions for producing the high-strength cold-rolled steel sheet according to the present invention, the high-strength cold-rolled steel sheet can be produced using a method that includes the processes described hereunder.

(a) Hot Rolling Process (a-1) Slab Heating Process

First, a slab is heated to a temperature of 1150° C. or more. In order to make the value of sol. Bq/B fall adequately within the predetermined range in the final product sheet, it is preferable to make the slab heating temperature 1150° C. or more to promote melting of borides. Note that, although a steel slab used is preferably cast by a continuous casting process from the viewpoint of producibility, the steel slab may also be cast by an ingot-making process or a thin slab casting process. Further, the cast slab may be cooled temporarily to room temperature or may be sent directly to a heating furnace without being cooled to room temperature.

(a-2) Rough Rolling Process

Next, the heated slab is rolled so that the total rolling reduction in a temperature range from 1050 to 1150° C. is 50% or more. If the total rolling reduction in the aforementioned temperature range is less than 50%, there is a risk that recrystallization during hot rolling will be insufficient and this will lead to heterogenization of the micro-structure of the hot-rolled sheet.

(a-3) Finish Rolling Process

The total rolling reduction from a temperature of 1050° C. or less to before the final pass of the finish rolling process (final finishing pass) is made 60 to 95%, and the rolling reduction in the final finishing pass is made 10 to 30% and the temperature for the final finishing pass is made 850 to 1000° C.

In a case where the total rolling reduction from a temperature of 1050° C. or less to before the final finishing pass is more than 95%, a case where the rolling reduction in the final finishing pass is more than 30%, or a case where the temperature in the final finishing pass is less than 850° C., boride precipitation during hot rolling is promoted. As a result, it becomes difficult to make the value of sol. Bq/B in the final product sheet fall within the predetermined range. On the other hand, in a case where the total rolling reduction from a temperature of 1050° C. or less to before the final finishing pass is less than 60%, a case where the rolling reduction in the final finishing pass is less than 10%, or a case where the temperature in the final finishing pass is more than 1000° C., there is a risk that coarsening of the micro-structure of the hot-rolled sheet and coarsening of the micro-structure of the final product sheet will occur, and consequently the workability will deteriorate.

(a-4) Descaling Process

The steel sheet surface is subjected to descaling one or more times during the process from rough rolling to finish rolling. At such time, the final descaling temperature is made 950 to 1100° C. If the final descaling temperature is less than 950° C., because the growth of scale after descaling is suppressed, it will be difficult to control an average thickness tsc of the scale of the steel sheet immediately after coiling of a hot-rolled coil, described later, to be within a desired range. On the other hand, if the final descaling temperature is more than 1100° C., because scale will grow excessively after the final descaling, there is a risk that scale will peel off during rolling and that defects in the appearance of the steel sheet will arise due to scale biting. Although the total number of times to perform descaling is not particularly defined, it is preferable to perform descaling two or more times to suppress the occurrence of defects in the appearance of the steel sheet caused by biting of scale that peeled off during rolling.

Other operating conditions that affect the average thickness tsc include the descaling water pressure and the elapsing time from final descaling to coiling, and furthermore, as illustrated in FIG. 1, a distance (D) from the nozzle to the steel sheet, and an angle (θ) formed between the nozzle and the sheet thickness direction of the steel sheet can also be important factors. Although the aforementioned conditions are not particularly defined according to the present invention as long as tsc is being controlled within the desired range, for example, the desired tsc can be obtained by making the descaling water pressure 10 to 20 MPa, the elapsing time from final descaling to coiling 15 to 40 seconds, the distance D from the nozzle to the steel sheet 150 to 250 mm, and the angle θ formed between the nozzle and the sheet thickness direction of the steel sheet 5 to 10°.

(a-5) Cooling Process

After one second or more passes after the finish rolling process ends, the steel sheet is cooled to a coiling temperature of 400 to 700° C. at an average cooling temperature of 5° C./s or more. If the time from the end of finish rolling to the start of cooling is less than one second, recrystallization of austenite will be insufficient and anisotropy of the steel sheet will be actualized, and therefore it is not preferable for the aforementioned time to be less than one second. Further, if the average cooling temperature from the end of finish rolling to the coiling temperature is less than 5° C./s, ferrite transformation will be promoted in a high temperature region and the micro-structure of the hot-rolled sheet will coarsen, and therefore it is not preferable for the aforementioned average cooling temperature to be less than 5° C./s.

In addition, if the coiling temperature is more than 700° C., boride precipitation will be promoted and it will therefore be difficult to make the value of sol. Bq/B fall within the predetermined range in the final product sheet. On the other hand, if the coiling temperature is less than 400° C., because the strength of the hot-rolled sheet will increase excessively, there is a risk that the strength will impair the cold rolling properties in a subsequent cold rolling process.

Average thickness tsc of scale immediately after coiling of hot-rolled coil: 3 μm or more To make the value of sol. Bs/B fall within the predetermined range, it is necessary to promote precipitation of boron compounds only in the surface layer portion of the steel sheet. For that purpose, it is preferable to make the scale that serves as a supply source of oxygen to the surface layer portion of the steel sheet 3 μm or more immediately after coiling. Although a limitation is not particularly set with respect to the upper limit of the thickness of the scale, if tsc is more than 15 μm, the following pickling will be difficult and the workability will deteriorate. Therefore, it is preferable to make tsc 15 km or less.

Note that, in practice it is difficult to directly measure the average thickness of the scale of the steel sheet immediately after coiling the hot-rolled coil. Therefore, a method for measuring tsc is adopted in which a hot-rolled steel sheet is separately manufactured using the same chemical composition and the same hot rolling conditions prior to coiling, and coiling of the steel sheet is then performed at a temperature at which scale does not sufficiently grow after coiling, specifically, a temperature of 300° C. or less, and the thickness of the scale thereof is measured and adopted as the measurement value for tsc.

$$10^{-5} < Do < 10^{-3} \quad \text{(iii)}$$

After coiling the hot-rolled coil, it is preferable to perform cooling so as to satisfy the above formula (iii). "Do" represents a value that relates to diffusion length of oxygen atoms in the steel, and a function defined by a temperature $T(t)[K]$ of the hot-rolled coil after the elapse of t seconds after coiling is determined by performing time integration from 0 seconds after coiling to tf (see formula (iv) below).

Note that, "tf" in formula (iv) represents an elapsing time until the temperature of the hot-rolled coil reaches 400° C.

[Formula 1]

$$Do = \int_0^{tf} \sqrt{10^{-4.4} \cdot \exp\left(\frac{-167000}{8.314 \cdot T(t)}\right)} \cdot dt \quad \text{(iv)}$$

In the above formula (iii), if the value of Do is less than the left-hand side, diffusion of oxygen atoms will be insufficient, and consequently boron compounds will not precipitate adequately in the surface layer portion of the steel sheet and it will be difficult to make the value of sol. Bs/B fall within the predetermined range. On the other hand, if the value of Do is larger than the right-hand side, the diffusion of oxygen atoms will proceed excessively and consequently boron compounds will precipitate not only in the surface layer portion of the steel sheet but also in the steel sheet interior, and it will be difficult to make the value of sol. Bq/B fall within the predetermined range. Note that the temperature T(t) of the hot-rolled coil after the elapse of t seconds may be measured with a thermo-viewer from outside or may be measured by inserting a thermocouple into the hot-rolled coil.

(a-6) Other

As needed, the hot-rolled coil after cooling may be subjected to pickling according to the normal method. Further, skin pass rolling may be performed to straighten the shape of the hot-rolled coil and improve the pickling property.

(b) Cold Rolling Process

Cold-rolling rate: 20 to 80%

Cold rolling is performed on the steel sheet after the hot rolling described above. In order to refine the austenite grain size during heating in a final annealing process described later, the cold-rolling rate is made 20% or more. On the other hand, because an excessive rolling reduction means that the applied rolling load becomes excessive and leads to an increase in the load of the cold rolling mill, the cold-rolling rate is made 80% or less. The cold-rolling rate is preferably 30% or more, and is preferably 70% or less.

(c) Annealing Process (c-1) Heating Process

Next, after the cold rolling described above, the steel sheet is subjected to annealing by means of a continuous annealing line. At this time, in order to promote segregation of boron atoms at the ferrite/austenite interface or at the austenite interface to improve the hardenability of the steel sheet, the average heating rate in a temperature range from 650° C. to the $Ac_3$ point is made 10° C./s or less. On the other hand, because producibility of the steel sheet will be hindered if the heating rate is too low, the aforementioned average heating rate is made 0.1° C./s or more.

Note that, the $Ac_3$ point (° C.) can be obtained by the following formula (v).

$Ac_3=910-203C^{0.5}-15.2Ni+44.7Si+104V+31.5Mo-30Mn-11Cr-20Cu+700P+400Al+400Ti$ (v)

Where, each symbol of an element in the formula represents the content (mass %) of the relevant element contained in the steel, and in a case where the content is 0, 0 is substituted into the formula to perform the calculation.

(c-2) Holding Process

After the temperature rises, the steel sheet is held for one second or more at a predetermined highest heating temperature. A particular limitation is not set with respect to the upper limit of the holding time. However, the producibility of the steel sheet will be impaired if the holding time is too long, and hence it is preferable to make the 1000 seconds the upper limit value of the holding time. Further, upper and lower limits of the highest heating temperature may be appropriately selected in a range in which austenitization is caused to adequately progress.

When placing the emphasis on bendability, the highest heating temperature is preferably made 720° C. or more, and more preferably is made 760° C. or more. However, in a case where the highest heating temperature is more than the $Ac_3$ point+30° C., it becomes difficult to obtain a desired amount of polygonal ferrite. Therefore, the highest heating temperature is preferably made the $Ac_3$ point+30° C. or less, and is more preferably made the $Ac_3$ point −10° C. or less.

On the other hand, when placing the emphasis on strength, the highest heating temperature is preferably made the $Ac_3$ point −30° C. or more, and is more preferably made the $Ac_3$ point or more. However, if the highest heating temperature is too high it will lead to damage of the heating furnace, and hence the $Ac_3$ point+100° C. is made the upper limit value thereof.

After holding the steel sheet at the aforementioned highest heating temperature, it is preferable to cool the steel sheet in two stages and thereafter subject the steel sheet to a heat treatment at a predetermined temperature. In other words, after the aforementioned holding process, treatment is performed that includes a first cooling process from the highest heating temperature to a first cooling stopping temperature, a second cooling process from a second cooling starting temperature that is equal to the aforementioned first cooling stopping temperature to a second cooling stopping temperature, and a heat treatment process of holding the steel sheet in a predetermined temperature range. Each of these processes is described hereunder.

(c-3) First Cooling Process

First, to promote ferrite transformation in the surface layer portion of the steel sheet, the steel sheet is cooled from the highest heating temperature to a temperature (first cooling stopping temperature) of 750° C. or less at an average cooling temperature of 10° C./s or less. The average cooling temperature is preferably 5° C./s or less. Further, the stopping temperature is preferably 700° C. or less, and more preferably is 650° C. or less.

(c-4) Second Cooling Process

In continuation from the above first cooling, the steel sheet is cooled from a second cooling starting temperature that is equal to the first cooling stopping temperature to a temperature (second cooling stopping temperature) that is not more than the Ms point. If the second cooling stopping temperature is more than the Ms point, it is difficult to make the proportion of tempered martensite to the martensite overall 50% or more, and there is a risk that the bendability will deteriorate.

Further, when placing the emphasis on the strength, the average cooling temperature is preferably made 10° C./s or more. If the average cooling temperature is less than 10° C./s, the area fraction of polygonal ferrite becomes excessive and there is a risk that the strength will decrease. Although it is not particularly necessary to define the upper limit of the average cooling temperature, it is preferable to make 300° C./s the upper limit because special facilities are required in order to realize a cooling rate that is more than 300° C./s.

Note that, the Ms point (° C.) can be determined by the following formula (vi).

$$Ms = 550 - 361C - 39Mn - 35V - 20Cr - 17Ni - 10Cu - 5Mo + 30A \quad (vi)$$

Where, each symbol of an element in the formula represents the content (mass %) of the relevant element contained in the steel, and in a case where the content is 0, 0 is substituted into the formula to perform the calculation.

(c-5) Heat Treatment Process

After the second cooling stops, a heat treatment is performed that holds the steel sheet in a temperature region of 200 to 400° C. for 10 seconds or more. If the aforementioned heat treatment temperature is less than 200° C. or the aforementioned holding time is less than 10 seconds, it will be difficult to make the proportion of tempered martensite to the martensite overall 50% or more, and there is a risk that the bendability will deteriorate. Further, if the aforementioned heat treatment temperature is more than 400° C., it will be difficult to secure strength because martensite will be excessively tempered. Although an upper limit of the holding time is not particularly defined, it is preferable from the viewpoint of productivity to make the upper limit of the holding time 1000 seconds or less.

Note that, in the case of performing hot-dip galvanization on the steel sheet surface, electrogalvanization may be performed after the steel sheet has passed through the aforementioned continuous annealing line, or the steel sheet may be passed through a continuous hot-dip galvanization line. The conditions for the common method may be followed with regard to the conditions for electrogalvanization. On the other hand, in the case of passing the steel sheet through a continuous hot-dip galvanization line, it is preferable to perform the treatment under the conditions described hereunder after the aforementioned first cooling process.

(c-6) Plating Process

In continuation from the aforementioned first cooling, after the steel sheet is cooled to a temperature of 420 to 520° C. (pre-plating temperature) from the first cooling stopping temperature, the steel sheet is immersed in a hot-dip galvanizing bath.

If the pre-plating temperature is less than 420° C., heat dissipation in the hot-dip galvanizing bath will increase and will hinder productivity. On the other hand, if the pre-plating temperature is more than 520° C., pearlite transformation will occur and it will therefore be difficult to obtain the desired steel micro-structure. Although the time from cooling to the pre-plating temperature to immersion in the hot-dip galvanizing bath is not particularly defined, it is preferable from the viewpoint of productivity that the time is 100 seconds or less.

(c-7) Alloying Treatment Process

In the case of performing an alloying treatment on the hot-dip galvanized layer, the alloying treatment temperature is made a temperature in the range of 460 to 580° C. If the alloying treatment temperature is less than 460° C., productivity will be hindered because a long time period will be required for the alloying reaction. On the other hand, if the alloying treatment temperature is more than 580° C., pearlite transformation will occur and it will therefore be difficult to obtain the desired steel micro-structure.

(c-8) Second Cooling Process

After immersion in the hot-dip galvanizing bath or after the alloying treatment, the steel sheet is cooled to a temperature (second cooling stopping temperature) that is not more than the Ms point. If the second cooling stopping temperature is more than the Ms point, it will be difficult to make the proportion of tempered martensite to the entire martensite 50% or more, and there is a risk that the bendability will deteriorate.

Further, when placing the emphasis on the strength, the average cooling temperature is preferably made 10° C./s or more. If the average cooling temperature is less than 10° C./s, the area fraction of bainite becomes excessive and there is a risk that the strength will decrease. Although it is not particularly necessary to define the upper limit of the average cooling temperature, it is preferable to make 300° C./s the upper limit because special facilities are required in order to realize a cooling rate that is more than 300° C./s.

(c-9) Heat Treatment Process

After the second cooling stops, a heat treatment is performed that holds the steel sheet in a temperature region of 200 to 400° C. for 10 seconds or more. If the aforementioned heat treatment temperature is less than 200° C. or the aforementioned holding time is less than 10 seconds, it will be difficult to make the proportion of tempered martensite to the entire martensite 50% or more, and there is a risk that the bendability will deteriorate. Further, if the aforementioned heat treatment temperature is more than 400° C., it will be difficult to secure strength because martensite will be excessively tempered. Although an upper limit of the holding time is not particularly defined, it is preferable from the viewpoint of productivity to make the upper limit of the holding time 1000 seconds or less.

(d) Other

After the heat treatment in the aforementioned (c-5) or (c-9), the steel sheet may be subjected to temper rolling for the purpose of flatness straightening and adjustment of the degree of surface roughness. In this case, to avoid a deterioration in ductility it is preferable to make the rate of elongation 2% or less.

Hereunder, the present invention is described more specifically by way of examples, although the present invention is not limited to the following examples.

Example 1

Steels having the chemical compositions shown in Table 1 were melted in a laboratory and ingots were cast. Thereafter, hot rolling was performed under the conditions shown in Table 2, and hot-rolled steel sheets having a thickness of 2.0 to 3.0 mm were obtained. Note that, when performing descaling prior to finish rolling, the descaling water pressure was 15 MPa, the elapsing time from final descaling to coiling was 30 seconds, a distance D from the nozzle to the steel sheet was 200 mm, and an angle θ formed between the nozzle and the thickness direction of the steel sheet was 10°.

Subsequently, pickling was performed, and thereafter cold rolling was performed with the rolling reductions shown in Table 3 to obtain cold-rolled steel sheets having a thickness of 1.0 mm. The obtained cold-rolled steel sheets were subjected to an annealing treatment under the conditions shown in Table 3.

TABLE 1

| Steel | C | Si | Mn | Al | Ti | B | P | S | O | N | Cr | Mo | Ni |
|---|---|---|---|---|---|---|---|---|---|---|---|---|---|
| A | 0.086 | 0.58 | 2.14 | 0.033 | 0.021 | 0.0025 | 0.008 | 0.0026 | 0.0010 | 0.0028 | | 0.14 | |
| B | 0.115 | 0.60 | 2.31 | 0.029 | 0.020 | 0.0023 | 0.008 | 0.0024 | 0.0017 | 0.0027 | | | |
| C | 0.129 | 0.55 | 2.33 | 0.028 | 0.021 | 0.0014 | 0.010 | 0.0019 | 0.0009 | 0.0033 | | | |
| D | 0.074 | 0.42 | 3.19 | 0.031 | 0.023 | 0.0018 | 0.008 | 0.0020 | 0.0014 | 0.0030 | | | |
| E | 0.122 | 0.63 | 1.69 | 0.030 | 0.019 | 0.0021 | 0.011 | 0.0027 | 0.0022 | 0.0029 | | 0.06 | |
| F | 0.216 | 0.59 | 1.47 | 0.031 | 0.022 | 0.0020 | 0.009 | 0.0022 | 0.0007 | 0.0024 | | | |
| G | 0.088 | 0.60 | 2.11 | 0.030 | 0.022 | 0.0022 | 0.008 | 0.0025 | 0.0011 | 0.0035 | | | |
| H | 0.106 | 1.28 | 2.03 | 0.027 | 0.020 | 0.0024 | 0.009 | 0.0028 | 0.0016 | 0.0031 | | | |
| I | 0.099 | 0.14 | 2.26 | 0.032 | 0.019 | 0.0025 | 0.010 | 0.0030 | 0.0009 | 0.0030 | | 0.07 | |
| J | 0.102 | 0.61 | 1.80 | 0.033 | 0.025 | 0.0020 | 0.010 | 0.0026 | 0.0021 | 0.0026 | 0.29 | | |
| K | 0.084 | 0.56 | 2.04 | 0.026 | 0.020 | 0.0022 | 0.007 | 0.0021 | 0.0015 | 0.0028 | | | 0.24 |
| L | 0.114 | 0.49 | 1.89 | 0.029 | 0.023 | 0.0024 | 0.008 | 0.0029 | 0.0024 | 0.0021 | | 0.08 | |
| M | 0.088 | 0.61 | 2.10 | 0.026 | 0.022 | 0.0023 | 0.011 | 0.0026 | 0.0018 | 0.0025 | | | |
| N | 0.091 | 0.49 | 1.52 | 0.025 | 0.023 | 0.0027 | 0.009 | 0.0025 | 0.0013 | 0.0025 | 0.25 | 0.13 | |
| O | 0.119 | 0.55 | 2.29 | 0.032 | 0.024 | 0.0026 | 0.010 | 0.0029 | 0.0010 | 0.0032 | | | |
| P | 0.112 | 0.41 | 2.28 | 0.033 | 0.020 | 0.0027 | 0.011 | 0.0030 | 0.0011 | 0.0025 | | | |
| Q | 0.112 | 0.62 | 2.25 | 0.028 | 0.023 | 0.0021 | 0.010 | 0.0020 | 0.0015 | 0.0034 | | | |
| R | 0.115 | 0.61 | 2.30 | 0.024 | 0.018 | 0.0025 | 0.012 | 0.0031 | 0.0008 | 0.0032 | | | |
| S | 0.098 | 0.54 | 2.28 | 0.025 | 0.020 | 0.0026 | 0.008 | 0.0027 | 0.0010 | 0.0029 | | | |
| T | 0.132 | 0.65 | 2.04 | 0.028 | 0.021 | 0.0020 | 0.011 | 0.0024 | 0.0005 | 0.0029 | | | |
| U | 0.118 | 0.70 | 2.34 | 0.026 | 0.022 | 0.0022 | 0.013 | 0.0025 | 0.0012 | 0.0030 | | | |
| V | 0.089 | 0.66 | 1.20 | 0.030 | 0.022 | 0.0024 | 0.011 | 0.0033 | 0.0008 | 0.0031 | 0.91 | | |
| W | 0.093 | 0.64 | 1.08 | 0.027 | 0.020 | 0.0025 | 0.012 | 0.0027 | 0.0014 | 0.0026 | | 0.52 | |
| X | 0.102 | 0.15 | 2.08 | 0.240 | 0.023 | 0.0026 | 0.010 | 0.0022 | 0.0009 | 0.0030 | | | |
| Y | 0.480* | 0.51 | 1.91 | 0.025 | 0.020 | 0.0023 | 0.012 | 0.0024 | 0.0010 | 0.0029 | | | |
| Z | 0.038* | 0.74 | 2.42 | 0.026 | 0.002 | 0.0025 | 0.008 | 0.0025 | 0.0013 | 0.0033 | | | |
| AA | 0.108 | 3.16* | 1.82 | 0.030 | 0.018 | 0.0021 | 0.009 | 0.0027 | 0.0009 | 0.0026 | | | |
| AB | 0.143 | 0.75 | 0.44* | 0.032 | 0.020 | 0.0025 | 0.011 | 0.0025 | 0.0010 | 0.0026 | | | |
| AC | 0.074 | 0.80 | 5.07* | 0.041 | 0.026 | 0.0021 | 0.007 | 0.0034 | 0.0017 | 0.0031 | | | |
| AD | 0.095 | 0.52 | 2.21 | 0.028 | 0.001* | 0.0022 | 0.008 | 0.0032 | 0.0020 | 0.0030 | | | |
| AE | 0.097 | 0.63 | 2.73 | 0.034 | 0.023 | 0.0003* | 0.009 | 0.0033 | 0.0014 | 0.0032 | | | |
| AF | 0.105 | 0.55 | 2.14 | 0.030 | 0.020 | 0.0110* | 0.013 | 0.0020 | 0.0015 | 0.0023 | | | |

| Steel | Ca | Sn | Nb | V | W | Ca | Mg | Bi | Sb | Zr | REM | Ac$_3$† (° C.) | Ms‡ (° C.) |
|---|---|---|---|---|---|---|---|---|---|---|---|---|---|
| A | | | 0.020 | | | | | | | | | 835 | 436 |
| B | | | | | | | | | | | | 816 | 419 |
| C | | | 0.018 | | | | | | | | | 810 | 413 |
| D | | | | | | | | | | | | 796 | 400 |
| E | | | | | | | | | | | | 838 | 441 |
| F | | | | | | | | | | | | 817 | 416 |
| G | | | 0.020 | | | | | | | | | 831 | 437 |
| H | | | | | | | | | | | | 857 | 433 |
| I | | | | | | | | | | | | 807 | 427 |
| J | | | | | | | | | | | | 835 | 438 |
| K | 0.23 | | | | | | | | | | | 822 | 435 |
| L | | | 0.024 | 0.11 | | | | | | | | 838 | 432 |
| M | | | 0.023 | 0.13 | 0.20 | | | | | | | 846 | 433 |
| N | | | | | | | | | | | | 843 | 453 |
| O | | | | | | 0.0023 | | | | | | 816 | 419 |
| P | | | | | | | | | | | 0.0035 | 813 | 422 |
| Q | | | | | | | 0.0039 | | | | | 820 | 423 |
| R | | | 0.020 | | | | | 0.0041 | 0.0370 | | | 817 | 420 |
| S | | 0.13 | | | | | | | | | | 818 | 426 |
| T | | | | | | | | | | 0.0040 | | 823 | 424 |
| U | | | | | | | | | | | 0.0033 | 821 | 417 |
| V | | | 0.021 | | | | | | | | | 853 | 454 |
| W | | | 0.020 | | | | | | | | | 890 | 473 |
| X | | | | | | | | | | | | 892 | 439 |
| Y | | | | | | | | | | | | 753 | 303 |
| Z | | | | | | | | | | | | 847 | 443 |
| AA | | | | | | | | | | | | 948 | 441 |
| AB | | | | | | | | | | | | 874 | 482 |
| AC | | | | | | | | | | | | 760 | 327 |
| AD | | | | | | | | | | | | 821 | 430 |
| AE | | | | | | | | | | | | 813 | 410 |
| AF | | | | | | | | | | | | 826 | 430 |

*indicates that conditions do not satisfy those defined by the present invention.
†Ac$_3$(° C.) = 910−230C$^{0.5}$ − 15.2Ni + 44.7Si + 104V + 31.5Mo − 30Mn − 11Cr − 20Ca + 700P + 400Al + 400Ti
‡Ms (° C.) = 550−361C − 39Mn − 35V − 20Cr − 17Ni − 10Ca − 5Mo + 30Al

TABLE 2

| | | Hot Rolling Conditions | | | | | | | | | | |
|---|---|---|---|---|---|---|---|---|---|---|---|---|
| Test No. | Steel | SRT (°C.) | R1 (%) | R2 (%) | R3 (%) | Td (°C.) | FT (°C.) | Δt (s) | CR1 (°C./s) | CT (°C.) | ts0 (μm) | Do × 10⁻⁶ | Thickness (mm) |
| 1 | A | 1250 | 74 | 88 | 15 | 1010 | 960 | 3.4 | 25 | 600 | 7 | 191 | 2.5 |
| 2 | A | 1250 | 74 | 88 | 15 | 1030 | 950 | 3.0 | 34 | 460 | 7 | 6 | 2.5 |
| 3 | A | 1250 | 74 | 88 | 15 | 990 | 960 | 2.0 | 27 | 600 | 7 | 7 | 2.5 |
| 4 | A | 1250 | 74 | 88 | 15 | 890 | 890 | 3.1 | 27 | 600 | 2 | 177 | 2.5 |
| 5 | A | 1250 | 74 | 88 | 15 | 990 | 980 | 3.2 | 13 | 740 | 8 | 716 | 2.5 |
| 6 | A | 1250 | 74 | 88 | 15 | 980 | 900 | 2.3 | 27 | 570 | 6 | 180 | 2.5 |
| 7 | A | 1250 | 74 | 88 | 15 | 1010 | 950 | 3.2 | 27 | 590 | 6 | 136 | 2.5 |
| 8 | A | 1250 | 74 | 88 | 15 | 1050 | 960 | 3.6 | 25 | 620 | 9 | 515 | 3.0 |
| 9 | A | 1250 | 74 | 88 | 15 | 990 | 950 | 3.0 | 22 | 610 | 7 | 154 | 2.5 |
| 10 | A | 1250 | 74 | 88 | 15 | 980 | 950 | 3.2 | 26 | 600 | 7 | 171 | 2.5 |
| 11 | A | 1250 | 74 | 88 | 15 | 970 | 940 | 2.8 | 38 | 550 | 6 | 30 | 2.5 |
| 12 | B | 1250 | 74 | 88 | 15 | 980 | 950 | 2.6 | 25 | 610 | 6 | 194 | 2.5 |
| 13 | B | 1250 | 74 | 88 | 15 | 1010 | 940 | 2.7 | 38 | 580 | 6 | 52 | 3.0 |
| 14 | B | 1250 | 74 | 88 | 15 | 1020 | 960 | 3.3 | 33 | 590 | 8 | 220 | 2.5 |
| 15 | B | 1250 | 74 | 88 | 15 | 990 | 950 | 2.7 | 30 | 600 | 7 | 161 | 2.5 |
| 16 | B | 1250 | 74 | 88 | 15 | 990 | 950 | 3.3 | 35 | 650 | 8 | 1674 | 2.5 |
| 17 | C | 1250 | 74 | 88 | 15 | 980 | 970 | 4.6 | 19 | 630 | 5 | 308 | 2.5 |
| 18 | D | 1250 | 74 | 88 | 15 | 990 | 950 | 1.7 | 30 | 650 | 8 | 390 | 2.0 |
| 19 | E | 1250 | 74 | 88 | 15 | 990 | 950 | 3.6 | 31 | 580 | 6 | 133 | 2.5 |
| 20 | F | 1250 | 74 | 88 | 15 | 1020 | 900 | 2.5 | 30 | 600 | 10 | 96 | 3.0 |
| 21 | G | 1250 | 74 | 88 | 15 | 1000 | 990 | 3.9 | 23 | 540 | 9 | 117 | 2.5 |
| 22 | G | 1250 | 74 | 88 | 15 | 970 | 950 | 1.8 | 42 | 610 | 8 | 123 | 2.5 |
| 23 | G | 1250 | 74 | 88 | 15 | 1010 | 990 | 2.2 | 31 | 580 | 6 | 41 | 2.5 |
| 24 | H | 1250 | 74 | 88 | 15 | 1000 | 930 | 4.2 | 41 | 640 | 7 | 407 | 2.5 |
| 25 | I | 1250 | 74 | 88 | 15 | 1030 | 980 | 1.9 | 33 | 550 | 10 | 115 | 2.5 |
| 26 | J | 1250 | 74 | 88 | 15 | 1020 | 950 | 2.2 | 29 | 580 | 7 | 108 | 2.0 |
| 27 | K | 1250 | 74 | 88 | 15 | 960 | 910 | 2.8 | 36 | 590 | 6 | 95 | 2.5 |
| 28 | L | 1250 | 74 | 88 | 15 | 990 | 930 | 3.0 | 42 | 620 | 8 | 61 | 2.5 |
| 29 | M | 1250 | 74 | 88 | 15 | 1010 | 970 | 4.5 | 24 | 660 | 7 | 690 | 2.5 |
| 30 | N | 1250 | 74 | 88 | 15 | 970 | 890 | 4.5 | 44 | 630 | 8 | 262 | 2.0 |
| 31 | O | 1250 | 74 | 88 | 15 | 1010 | 950 | 2.6 | 25 | 610 | 6 | 105 | 2.5 |
| 32 | P | 1250 | 74 | 88 | 15 | 104 | 950 | 4.1 | 39 | 600 | 7 | 126 | 2.5 |
| 33 | Q | 1250 | 74 | 88 | 15 | 1050 | 1000 | 2.8 | 33 | 570 | 10 | 37 | 2.5 |
| 34 | R | 1250 | 74 | 88 | 15 | 1030 | 990 | 2.0 | 50 | 630 | 5 | 100 | 2.5 |
| 35 | S | 1250 | 74 | 88 | 15 | 1010 | 980 | 2.5 | 37 | 610 | 7 | 229 | 2.5 |
| 36 | T | 1250 | 74 | 88 | 15 | 970 | 930 | 3.4 | 17 | 650 | 7 | 238 | 2.5 |
| 37 | U | 1250 | 74 | 88 | 15 | 980 | 970 | 2.6 | 35 | 600 | 8 | 57 | 2.5 |
| 38 | V | 1250 | 74 | 88 | 15 | 990 | 920 | 4.6 | 44 | 580 | 9 | 119 | 2.5 |
| 39 | W | 1250 | 74 | 88 | 15 | 1020 | 890 | 3.3 | 24 | 600 | 8 | 180 | 2.5 |
| 40 | X | 1250 | 74 | 88 | 15 | 1000 | 950 | 4.0 | 48 | 620 | 8 | 185 | 2.5 |
| 41 | Y* | 1250 | 74 | 88 | 15 | 1000 | 930 | 3.5 | 22 | 600 | 7 | 104 | 2.0 |
| 42 | Z* | 1250 | 74 | 88 | 15 | 980 | 900 | 3.1 | 37 | 610 | 7 | 223 | 2.5 |
| 43 | AA* | 1250 | 74 | 88 | 15 | 990 | 900 | 4.2 | 27 | 600 | 6 | 149 | 2.5 |
| 44 | AB* | 1250 | 74 | 88 | 15 | 970 | 960 | 3.7 | 29 | 640 | 7 | 401 | 2.5 |
| 45 | AC* | 1250 | 74 | 88 | 15 | 1010 | 900 | 2.2 | 41 | 630 | 9 | 277 | 2.0 |
| 46 | AD* | 1250 | 74 | 88 | 15 | 1010 | 920 | 2.3 | 30 | 660 | 7 | 510 | 2.5 |
| 47 | AE* | 1250 | 74 | 88 | 15 | 960 | 890 | 3.7 | 25 | 620 | 8 | 266 | 2.5 |
| 48 | AF* | 1250 | 74 | 88 | 15 | 1000 | 950 | 1.8 | 40 | 590 | 7 | 34 | 2.0 |

*indicates that conditions do not satisfy those defined by the present invention.

TABLE 3

| | | Cold Rolling Conditions | | Annealing Conditions | | | | | | | | |
|---|---|---|---|---|---|---|---|---|---|---|---|---|
| Test No. | Steel | Cold-rolling rate (%) | Thickness (mm) | HR (°C./s) | T1 (°C.) | t1 (s) | CR2 (°C./s) | T2 (°C.) | CR3 (°C./s) | T3 (°C.) | T4 (°C.) | t2 (s) |
| 1 | A | 60 | 1.0 | 1.2 | 810 | 108 | 4.6 | 650 | 50 | 270 | 310 | 310 |
| 2 | A | 60 | 1.0 | 1.1 | 800 | 108 | 4.0 | 660 | 50 | 285 | 310 | 270 |
| 3 | A | 60 | 1.0 | 1.2 | 815 | 108 | 4.7 | 650 | 50 | 295 | 325 | 330 |
| 4 | A | 60 | 1.0 | 1.1 | 805 | 108 | 3.6 | 680 | 50 | 260 | 320 | 315 |
| 5 | A | 60 | 1.0 | 1.2 | 815 | 108 | 4.4 | 660 | 50 | 275 | 305 | 295 |
| 6 | A | 60 | 1.0 | 1.0 | 780 | 108 | 4.6 | 620 | 50 | 280 | 280 | 260 |
| 7 | A | 60 | 1.0 | 1.1 | 805 | 108 | 4.7 | 640 | 50 | 250 | 250 | 70 |
| 8 | A | 67 | 1.0 | 1.1 | 805 | 108 | 4.4 | 650 | 50 | 240 | 280 | 275 |
| 9 | A | 60 | 1.0 | 1.1 | 805 | 108 | 25.0 | 650 | 50 | 270 | 280 | 250 |
| 10 | A | 60 | 1.0 | 1.1 | 805 | 108 | 4.0 | 780 | 50 | 270 | 280 | 415 |
| 11 | A | 60 | 1.0 | 1.1 | 795 | 108 | 4.0 | 650 | 50 | 250 | 260 | 340 |
| 12 | B | 60 | 1.0 | 1.0 | 785 | 108 | 3.6 | 660 | 50 | 265 | 285 | 425 |
| 13 | B | 67 | 1.0 | 1.1 | 805 | 108 | 4.4 | 650 | 50 | 350 | 350 | 270 |
| 14 | B | 60 | 1.0 | 0.8 | 760 | 108 | 3.4 | 640 | 50 | 200 | 200 | 320 |
| 15 | B | 60 | 1.0 | 1.0 | 790 | 108 | 3.7 | 660 | 50 | 500 | 500 | 235 |

TABLE 3-continued

| | | Cold Rolling Conditions | | Annealing Conditions | | | | | | | | |
|---|---|---|---|---|---|---|---|---|---|---|---|---|
| Test No. | Steel | Cold-rolling rate (%) | Thickness (mm) | HR (° C./s) | T1 (° C.) | t1 (s) | CR2 (° C./s) | T2 (° C.) | CR3 (° C./s) | T3 (° C.) | T4 (° C.) | t2 (s) |
| 16 | B | 60 | 1.0 | 1.0 | 790 | 108 | 4.0 | 650 | 50 | 260 | 290 | 305 |
| 17 | C | 60 | 1.0 | 1.0 | 785 | 108 | 3.9 | 650 | 50 | 290 | 310 | 355 |
| 18 | D | 50 | 1.0 | 0.8 | 755 | 108 | 3.0 | 650 | 50 | 240 | 260 | 265 |
| 19 | E | 60 | 1.0 | 1.3 | 820 | 108 | 5.4 | 630 | 50 | 280 | 280 | 280 |
| 20 | F | 67 | 1.0 | 1.1 | 800 | 108 | 5.1 | 620 | 50 | 300 | 320 | 315 |
| 21 | G | 60 | 1.0 | 1.2 | 815 | 108 | 5.0 | 640 | 50 | 260 | 270 | 365 |
| 22 | G | 60 | 1.0 | 1.3 | 830 | 108 | 5.1 | 650 | 50 | 240 | 320 | 440 |
| 23 | G | 60 | 1.0 | 1.2 | 810 | 108 | 4.6 | 650 | 50 | 250 | 290 | 320 |
| 24 | H | 60 | 1.0 | 1.2 | 815 | 108 | 5.0 | 640 | 50 | 280 | 360 | 300 |
| 25 | I | 60 | 1.0 | 1.1 | 800 | 108 | 4.9 | 630 | 50 | 260 | 280 | 300 |
| 26 | J | 50 | 1.0 | 1.2 | 815 | 108 | 4.4 | 660 | 50 | 260 | 300 | 225 |
| 27 | K | 60 | 1.0 | 1.1 | 805 | 108 | 4.7 | 640 | 50 | 280 | 300 | 430 |
| 28 | L | 60 | 1.0 | 1.1 | 800 | 108 | 4.9 | 630 | 50 | 280 | 315 | 270 |
| 29 | M | 60 | 1.0 | 1.2 | 810 | 108 | 4.6 | 650 | 50 | 250 | 270 | 330 |
| 30 | N | 50 | 1.0 | 1.3 | 825 | 108 | 5.0 | 650 | 50 | 240 | 300 | 315 |
| 31 | O | 60 | 1.0 | 1.0 | 790 | 108 | 3.7 | 660 | 50 | 265 | 285 | 300 |
| 32 | P | 60 | 1.0 | 1.0 | 790 | 108 | 4.3 | 640 | 50 | 270 | 290 | 300 |
| 33 | Q | 60 | 1.0 | 1.1 | 800 | 108 | 3.7 | 670 | 50 | 260 | 270 | 310 |
| 34 | R | 60 | 1.0 | 1.1 | 795 | 108 | 4.7 | 630 | 50 | 280 | 280 | 345 |
| 35 | S | 60 | 1.0 | 1.1 | 800 | 108 | 4.6 | 640 | 50 | 280 | 290 | 330 |
| 36 | T | 60 | 1.0 | 1.0 | 785 | 108 | 4.1 | 640 | 50 | 320 | 350 | 190 |
| 37 | U | 60 | 1.0 | 1.0 | 790 | 108 | 3.1 | 680 | 50 | 290 | 330 | 320 |
| 38 | V | 60 | 1.0 | 1.3 | 820 | 108 | 4.0 | 680 | 50 | 300 | 300 | 225 |
| 39 | W | 60 | 1.0 | 1.4 | 840 | 108 | 5.4 | 650 | 50 | 280 | 300 | 245 |
| 40 | X | 60 | 1.0 | 1.4 | 845 | 108 | 4.7 | 680 | 50 | 250 | 300 | 330 |
| 41 | Y* | 50 | 1.0 | 0.8 | 755 | 108 | 3.9 | 620 | 50 | 300 | 300 | 370 |
| 42 | Z* | 60 | 1.0 | 1.3 | 830 | 108 | 4.9 | 660 | 50 | 260 | 270 | 425 |
| 43 | AA* | 60 | 1.0 | 1.6 | 870 | 108 | 6.3 | 650 | 50 | 270 | 300 | 310 |
| 44 | AB* | 60 | 1.0 | 1.6 | 860 | 108 | 6.0 | 650 | 50 | 240 | 260 | 315 |
| 45 | AC* | 50 | 1.0 | 0.7 | 750 | 108 | 3.7 | 620 | 50 | 240 | 280 | 315 |
| 46 | AD* | 60 | 1.0 | 1.1 | 795 | 108 | 4.4 | 640 | 50 | 250 | 270 | 275 |
| 47 | AE* | 60 | 1.0 | 1.0 | 780 | 108 | 3.4 | 660 | 50 | 280 | 290 | 315 |
| 48 | AF* | 50 | 1.0 | 1.1 | 800 | 108 | 4.3 | 650 | 50 | 290 | 300 | 265 |

*indicates that conditions do not satisfy those defined by the present invention.

<Items in Table 2>
SRT: Slab heating temperature
R1: Total rolling reduction at 1050 to 1150° C.
R2: Total rolling reduction from 1050° C. or less to before final finishing pass
R3: Rolling reduction in final finishing pass
Td: Final descaling temperature
FT: Entrance-side temperature for final finishing pass
Δt: Time from end of finish rolling to start of cooling
CR1: Average cooling temperature from FT to CT
CT: Coiling temperature
tsc: Scale thickness immediately after coiling
Do: Value calculated by formula (iv)
<Items in Table 3>
HR: Average heating rate in temperature range from 650° C. to highest heating temperature
T1: Highest heating temperature
t: Heating holding time
CR2: First cooling rate
T2: Second cooling starting temperature
CR3: Second cooling rate
T3: Second cooling stopping temperature
T4: Heat treatment temperature
t2: Holding time at heat treatment temperature A JIS No. 5 tensile test specimen was taken from a direction (width direction) orthogonal to the thickness direction and the rolling direction of each of the obtained cold-rolled steel sheets, and a tensile test was performed in accordance with JIS Z 2241 and the tensile strength (TS), yield strength (YS) and total elongation (El) were measured.

Further, a test specimen with dimensions of 150 mm×150 mm was cut out, and a "JFS T 1001 Hole Expansion Test Method" of the Japan Iron and Steel Federation Standards was performed to measure the hole expansion ratio (λ). In addition, a strip test specimen was cut out in an orthogonal direction (width direction) to the rolling direction and thickness direction, the V-bending test specified in JIS Z 2248 was performed while varying the bending radius, and a minimum bending radius R at which cracking did not occur was determined, and the bendability was evaluated based on a ratio (R/t) between the sheet thickness t of the cold-rolled steel sheet and the minimum bending radius R.

Further, the area fractions of the steel micro-structure and the values of sol. Bs/B and sol. Bq/B were measured by the methods described hereunder.

First, a section in the rolling direction of the steel sheet was cut out, and the steel micro-structure was revealed by means of a nital solution. Thereafter, a position from the surface to a depth of 30 i±m and a position at ¼ thickness of the steel sheet were photographed using a scanning electron microscope (magnification: ×5000, 5 visual fields). The area fractions of polygonal ferrite, bainite, martensite and tempered martensite were then calculated by the point counting method based on the obtained micro-structure photographs.

Further, with respect to the area fraction of retained austenite, the area fraction was determined by calculating the area of a region having an FCC structure by the EBSP-OIM (Electron Back Scatter Diffraction Pattern-Orientation Image Microscopy) method.

In addition, for each of the surface layer portion and the interior of the steel sheet, the values of sol. Bs and sol. Bq were determined by calculating the B amount consumed as a precipitate by measuring the mass of borides in the steel by the electrolytic extraction residue method, and thereafter deducting the calculated B amount from the B content contained in the steel.

Specifically, with regard to the content of B present as borides in the surface layer portion of the steel sheet, the value was measured by electrolytic extraction to a depth of 30 μm without grinding the steel sheet surface. Further, with regard to the content of B present as boride in the interior of the steel sheet, the value was measured by mechanically grinding the steel sheet to a position of ¼ thickness, and thereafter performing electrolytic extraction to a depth of 30 μm. Note that, the technique disclosed in Non-Patent Document 1 was used as the method for determining the precipitated B amount by the extraction residue method.

The results of these measurements are shown in Tables 4 and 5. Note that, in the present example the emphasis was placed on bendability, and the result was determined as being good in a case where the tensile strength was 980 MPa or more and the ratio R/t between the sheet thickness t and the minimum bending radius R was 2.5 or less.

TABLE 4

| Test No. | Steel | Microstructure of surface layer portion (vol. %) | | | | | Microstructure of inner portion (vol. %) | | | | |
|---|---|---|---|---|---|---|---|---|---|---|---|
| | | Vα | VB | VM | VTM/VM | Vγ | Vα | VB | VM | VTM/VM | Vγ |
| 1 | A | 76 | 5 | 16 | 80 | 2 | 31 | 12 | 53 | 82 | 3 |
| 2 | A | 28 | 10 | 58 | 72 | 3 | 32 | 17 | 48 | 84 | 2 |
| 3 | A | 28 | 11 | 58 | 60 | 2 | 34 | 17 | 47 | 75 | 1 |
| 4 | A | 27 | 9 | 61 | 67 | 2 | 30 | 15 | 51 | 79 | 3 |
| 5 | A | 71 | 3 | 23 | 70 | 2 | 72 | 3 | 22 | 88 | 2 |
| 6 | A | 77 | 5 | 15 | 72 | 2 | 50 | 6 | 40 | 71 | 3 |
| 7 | A | 75 | 4 | 18 | 54 | 2 | 35 | 11 | 50 | 56 | 3 |
| 8 | A | 78 | 4 | 15 | 77 | 2 | 52 | 5 | 41 | 60 | 1 |
| 9 | A | 27 | 16 | 54 | 85 | 2 | 28 | 13 | 57 | 87 | 1 |
| 10 | A | 25 | 12 | 60 | 85 | 2 | 25 | 16 | 55 | 85 | 3 |
| 11 | A | 58 | 6 | 33 | 80 | 2 | 35 | 10 | 53 | 83 | 1 |
| 12 | B | 73 | 0 | 24 | 74 | 2 | 30 | 16 | 49 | 85 | 4 |
| 13 | B | 61 | 19 | 17 | 55 | 2 | 25 | 50 | 20 | 59 | 4 |
| 14 | B | 79 | 0 | 18 | 61 | 2 | 49 | 9 | 47 | 65 | 3 |
| 15 | B | 62 | 11 | 25 | 10 | 1 | 29 | 21 | 48 | 10 | 1 |
| 16 | B | 74 | 4 | 20 | 61 | 1 | 73 | 7 | 18 | 63 | 1 |
| 17 | C | 72 | 10 | 15 | 78 | 2 | 36 | 14 | 45 | 86 | 4 |
| 18 | D | 77 | 0 | 22 | 59 | 0 | 30 | 0 | 65 | 91 | 4 |
| 19 | E | 62 | 14 | 22 | 66 | 1 | 33 | 16 | 47 | 80 | 3 |
| 20 | F | 63 | 7 | 29 | 71 | 0 | 22 | 24 | 50 | 89 | 3 |
| 21 | G | 77 | 0 | 21 | 85 | 1 | 27 | 5 | 67 | 90 | 0 |
| 22 | G | 71 | 3 | 24 | 88 | 1 | 12 | 4 | 82 | 83 | 1 |
| 23 | G | 57 | 7 | 33 | 74 | 2 | 31 | 12 | 55 | 75 | 1 |
| 24 | H | 75 | 0 | 19 | 90 | 5 | 33 | 16 | 43 | 85 | 7 |
| 25 | I | 74 | 9 | 16 | 70 | 0 | 17 | 14 | 68 | 81 | 0 |
| 26 | J | 72 | 5 | 20 | 76 | 2 | 35 | 16 | 46 | 79 | 2 |
| 27 | K | 76 | 5 | 18 | 70 | 0 | 21 | 20 | 56 | 74 | 2 |
| 28 | L | 65 | 7 | 26 | 62 | 1 | 42 | 8 | 47 | 73 | 2 |
| 29 | M | 78 | 4 | 17 | 71 | 0 | 31 | 6 | 60 | 84 | 2 |
| 30 | N | 75 | 0 | 24 | 81 | 0 | 33 | 5 | 60 | 80 | 1 |
| 31 | O | 77 | 0 | 22 | 78 | 0 | 28 | 15 | 54 | 70 | 2 |
| 32 | P | 73 | 0 | 25 | 77 | 1 | 26 | 18 | 54 | 70 | 1 |
| 33 | Q | 55 | 5 | 39 | 64 | 0 | 24 | 10 | 63 | 91 | 2 |
| 34 | R | 73 | 5 | 19 | 73 | 2 | 32 | 5 | 60 | 77 | 2 |
| 35 | S | 76 | 7 | 16 | 75 | 0 | 28 | 10 | 60 | 83 | 1 |
| 36 | T | 72 | 6 | 20 | 75 | 1 | 24 | 19 | 56 | 86 | 0 |
| 37 | U | 70 | 6 | 22 | 72 | 1 | 38 | 13 | 46 | 75 | 2 |
| 38 | V | 72 | 0 | 24 | 90 | 3 | 33 | 14 | 49 | 86 | 3 |
| 39 | W | 71 | 0 | 26 | 87 | 2 | 38 | 11 | 48 | 90 | 2 |
| 40 | X | 73 | 5 | 20 | 81 | 1 | 38 | 10 | 50 | 76 | 1 |
| 41 | Y* | 24 | 0 | 70 | 35 | 5 | 8 | 13 | 73 | 37 | 5 |
| 42 | Z* | 88 | 3 | 8 | 90 | 0 | 89 | 3 | 7 | 95 | 0 |
| 43 | AA* | 70 | 4 | 20 | 20 | 5 | 40 | 5 | 48 | 28 | 6 |
| 44 | AB* | 90 | 9 | 0 | — | 0 | 91 | 8 | 0 | — | 0 |
| 45 | AC* | 20 | 0 | 74 | 16 | 5 | 14 | 0 | 80 | 15 | 5 |
| 46 | AD* | 71 | 9 | 18 | 60 | 1 | 72 | 10 | 15 | 76 | 2 |
| 47 | AE* | 72 | 19 | 8 | 70 | 0 | 77 | 13 | 8 | 70 | 1 |
| 48 | AF* | 75 | 3 | 21 | 74 | 0 | 72 | 6 | 21 | 71 | 0 |

*indicates that conditions do not satisfy those defined by the present invention.

TABLE 5

| Test No. | Steel | Presence state of B sol. Bs (ppm) | sol. Bs/B | sol. Bq (ppm) | sol. Bq/B | Mechanical Properties YS (MPa) | TS (MPa) | El (%) | λ (%) | R/t | |
|---|---|---|---|---|---|---|---|---|---|---|---|
| 1 | A | 3 | 0.12 | 24 | 0.96 | 713 | 1108 | 16.1 | 40 | 0.5 | Inventive ex. |
| 2 | A | 23 | 0.92* | 23 | 0.92 | 716 | 1076 | 15.4 | 31 | 3.0 | Comparative |
| 3 | A | 21 | 0.84* | 24 | 0.96 | 709 | 1061 | 14.9 | 30 | 3.0 | example |
| 4 | A | 22 | 0.88* | 24 | 0.96 | 722 | 1083 | 15.8 | 26 | 3.0 | |
| 5 | A | 5 | 0.20 | 7 | 0.28* | 589 | 816 | 23.7 | 42 | 0.5 | |
| 6 | A | 5 | 0.20 | 24 | 0.96 | 667 | 985 | 17.7 | 30 | 1.0 | Inventive |
| 7 | A | 3 | 0.12 | 24 | 0.96 | 726 | 1138 | 14.2 | 28 | 1.0 | example |
| 8 | A | 2 | 0.08 | 15 | 0.60 | 615 | 992 | 18.6 | 31 | 1.0 | |
| 9 | A | 3 | 0.12 | 25 | 1.00 | 725 | 1098 | 14.4 | 37 | 2.5 | |
| 10 | A | 3 | 0.12 | 25 | 1.00 | 731 | 1122 | 14.1 | 40 | 2.5 | |
| 11 | A | 9 | 0.36 | 24 | 0.96 | 710 | 1099 | 16.3 | 37 | 1.0 | |
| 12 | B | 4 | 0.17 | 22 | 0.96 | 723 | 1106 | 15.0 | 29 | 0.5 | |
| 13 | B | 8 | 0.35 | 22 | 0.96 | 647 | 1038 | 17.3 | 34 | 1.0 | |
| 14 | B | 4 | 0.17 | 23 | 1.00 | 544 | 996 | 19.5 | 30 | 1.0 | |
| 15 | B | 3 | 0.13 | 23 | 1.00 | 550 | 1061 | 17.6 | 27 | 2.5 | |
| 16 | B | 3 | 0.13 | 7 | 0.30* | 522 | 846 | 20.2 | 47 | 1.5 | Comp. ex. |
| 17 | C | 2 | 0.14 | 14 | 1.00 | 599 | 1022 | 17.0 | 36 | 0.5 | Inventive |
| 18 | D | 1 | 0.06 | 17 | 0.94 | 743 | 1090 | 12.8 | 42 | 0.5 | example |
| 19 | E | 3 | 0.14 | 20 | 0.95 | 703 | 1004 | 15.8 | 37 | 1.0 | |
| 20 | F | 2 | 0.10 | 19 | 0.95 | 820 | 1124 | 12.6 | 39 | 1.0 | |
| 21 | G | 2 | 0.09 | 21 | 0.95 | 698 | 991 | 16.0 | 51 | 0.5 | |
| 22 | G | 3 | 0.14 | 21 | 0.95 | 813 | 1087 | 11.2 | 55 | 0.5 | |
| 23 | G | 8 | 0.36 | 22 | 1.00 | 686 | 1019 | 16.1 | 45 | 1.0 | |
| 24 | H | 1 | 0.04 | 23 | 0.96 | 657 | 992 | 20.6 | 45 | 0.5 | |
| 25 | I | 2 | 0.08 | 25 | 1.00 | 794 | 1028 | 10.5 | 59 | 0.5 | |
| 26 | J | 2 | 0.10 | 19 | 0.95 | 695 | 1050 | 16.4 | 32 | 0.5 | |
| 27 | K | 3 | 0.14 | 22 | 1.00 | 667 | 988 | 15.6 | 47 | 0.5 | |
| 28 | L | 6 | 0.25 | 23 | 0.96 | 593 | 1006 | 16.3 | 33 | 1.0 | |
| 29 | M | 1 | 0.04 | 22 | 0.96 | 656 | 1082 | 14.2 | 34 | 0.5 | |
| 30 | N | 2 | 0.07 | 26 | 0.96 | 633 | 1040 | 12.9 | 50 | 0.5 | |
| 31 | O | 3 | 0.12 | 24 | 0.92 | 703 | 1074 | 14.6 | 39 | 0.5 | |
| 32 | P | 3 | 0.11 | 27 | 1.00 | 717 | 1100 | 14.2 | 35 | 0.5 | |
| 33 | Q | 2 | 0.10 | 20 | 0.95 | 691 | 1077 | 15.0 | 40 | 1.0 | |
| 34 | R | 4 | 0.16 | 23 | 0.92 | 678 | 1056 | 16.2 | 34 | 0.5 | |
| 35 | S | 4 | 0.15 | 23 | 0.88 | 692 | 1016 | 15.9 | 35 | 0.5 | |
| 36 | T | 2 | 0.10 | 20 | 1.00 | 801 | 1138 | 11.9 | 35 | 0.5 | |
| 37 | U | 2 | 0.09 | 22 | 1.00 | 652 | 1004 | 14.0 | 37 | 0.5 | |
| 38 | V | 3 | 0.13 | 24 | 1.00 | 582 | 992 | 17.7 | 27 | 0.5 | |
| 39 | W | 1 | 0.04 | 24 | 0.96 | 626 | 1019 | 16.7 | 31 | 0.5 | |
| 40 | X | 2 | 0.08 | 25 | 0.96 | 590 | 1001 | 18.2 | 25 | 0.5 | |
| 41 | Y* | 3 | 0.13 | 22 | 0.96 | 992 | 1618 | 8.3 | 15 | 5.0 | Comparative |
| 42 | Z* | 2 | 0.08 | 24 | 0.96 | 491 | 618 | 27.2 | 66 | 0.5 | example |
| 43 | AA* | 3 | 0.14 | 20 | 0.95 | 668 | 1217 | 14.6 | 21 | 4.0 | |
| 44 | AB* | 1 | 0.04 | 24 | 0.96 | 421 | 559 | 29.1 | 67 | 0.5 | |
| 45 | AC* | 3 | 0.14 | 20 | 0.95 | 714 | 1207 | 10.5 | 8 | 3.5 | |
| 46 | AD* | 3 | 0.14 | 6 | 0.27* | 626 | 849 | 19.8 | 42 | 0.5 | |
| 47 | AE* | 1 | 0.33 | 3 | 1.00 | 599 | 913 | 18.2 | 41 | 0.5 | |
| 48 | AF* | 18 | 0.16 | 22 | 0.20* | 570 | 914 | 21.0 | 34 | 1.0 | |

*indicates that conditions do not satisfy those defined by the present invention.

<Items in Table 4>
Vα: Area fraction of polygonal ferrite
VB: Area fraction of bainite
VM: Area fraction of martensite
VTM: Area fraction of tempered martensite
Vγ: Area fraction of retained austenite
<Items in Table 5>
sol. Bs: Soluble B amount in surface layer portion (mass ppm)
sol. Bq: Soluble B amount in interior (mass ppm)
YS: Yield strength
TS: Tensile strength
El: Total elongation
λ: Hole expansion ratio
R/t: Minimum bending radius/sheet thickness In the example embodiments of the present invention in which the chemical composition and the presence state of B satisfied the ranges defined by the present invention, the results showed that the tensile strength was 980 MPa or more and the value of R/t was 2.5 or less, and the example embodiments thus had high strength and favorable bendability.

On the other hand, in comparative examples in which one of or both of the chemical composition and the presence state of B were outside the ranges defined by the present invention, the results showed that a tensile strength of 980 MPa or more or favorable bendability was not obtained.

Example 2

Among the steels having the chemical compositions shown in Table 1, steels A and B were melted in a laboratory and ingots were cast. Thereafter, hot rolling was performed under the conditions shown in Table 6, and hot-rolled steel sheets having a thickness of 2.5 mm were obtained. Note that, the various conditions in the descaling process were the same as in Example 1. Thereafter, pickling was performed, followed by cold rolling with the rolling reductions shown in Table 7 to obtain cold-rolled steel sheets having a thickness of 1.0 mm. The obtained cold-rolled steel sheets were subjected to a heat treatment that simulated a continuous hot dip galvanization line under the conditions shown in Table 7.

TABLE 6

| | | Hot Rolling Conditions | | | | | | | | | | | |
|---|---|---|---|---|---|---|---|---|---|---|---|---|---|
| Test No. | Steel | SRT (° C.) | R1 (%) | R2 (%) | R3 (%) | Td (° C.) | FT (° C.) | Δt (s) | CR1 (° C./s) | CT (° C.) | tsc (μm) | Do × 10⁻⁶ | Thickness (mm) |
| 1 | A | 1250 | 74 | 88 | 15 | 1010 | 960 | 3.4 | 25 | 600 | 7 | 191 | 2.5 |
| 2 | A | 1250 | 74 | 88 | 15 | 1030 | 950 | 3.0 | 34 | 460 | 7 | 6 | 2.5 |
| 3 | A | 1250 | 74 | 88 | 15 | 990 | 960 | 2.0 | 27 | 600 | 7 | 7 | 2.5 |
| 4 | A | 1250 | 74 | 88 | 15 | 890 | 890 | 3.1 | 27 | 600 | 2 | 177 | 2.5 |
| 5 | A | 1250 | 74 | 88 | 15 | 990 | 980 | 3.2 | 13 | 740 | 8 | 716 | 2.5 |
| 6 | A | 1250 | 74 | 88 | 15 | 980 | 900 | 2.3 | 27 | 570 | 6 | 180 | 2.5 |
| 7 | A | 1250 | 74 | 88 | 15 | 1010 | 950 | 3.2 | 27 | 590 | 6 | 136 | 2.5 |
| 8 | A | 1250 | 74 | 88 | 15 | 1050 | 960 | 3.6 | 25 | 620 | 9 | 515 | 3.0 |
| 9 | A | 1250 | 74 | 88 | 15 | 990 | 950 | 3.0 | 22 | 610 | 7 | 154 | 2.5 |
| 10 | A | 1250 | 74 | 88 | 15 | 980 | 950 | 3.2 | 26 | 600 | 7 | 171 | 2.5 |
| 11 | A | 1250 | 74 | 88 | 15 | 970 | 940 | 2.8 | 38 | 550 | 6 | 30 | 2.5 |
| 12 | A | 1250 | 74 | 88 | 15 | 1020 | 980 | 4.0 | 26 | 610 | 7 | 182 | 2.5 |
| 13 | B | 1250 | 74 | 88 | 15 | 980 | 950 | 2.6 | 25 | 610 | 6 | 194 | 2.5 |
| 14 | B | 1250 | 74 | 88 | 15 | 1010 | 940 | 2.7 | 38 | 580 | 6 | 52 | 3.0 |
| 15 | B | 1250 | 74 | 88 | 15 | 1020 | 960 | 3.3 | 33 | 590 | 8 | 220 | 2.5 |
| 16 | B | 1250 | 74 | 88 | 15 | 990 | 940 | 2.9 | 32 | 600 | 7 | 164 | 2.5 |

TABLE 7

| | | Cold Rolling Conditions | | Annealing Conditions | | | | | | | | | | |
|---|---|---|---|---|---|---|---|---|---|---|---|---|---|---|
| Test No. | Steel | Cold-rolling rate (%) | Thickness (mm) | HR (° C./s) | T1 (° C.) | t1 (s) | CR2 (° C./s) | T2 (° C.) | T5 (° C.) | T6 (° C.) | CR3 (° C./s) | T3 (° C.) | T4 (° C.) | t2 (s) |
| 1 | A | 60 | 1.0 | 1.5 | 810 | 60 | 3.6 | 650 | 470 | 510 | 35 | 240 | 340 | 30 |
| 2 | A | 60 | 1.0 | 1.5 | 805 | 60 | 3.2 | 660 | 480 | 520 | 35 | 270 | 320 | 20 |
| 3 | A | 60 | 1.0 | 1.6 | 815 | 60 | 3.7 | 650 | 460 | 510 | 35 | 270 | 340 | 20 |
| 4 | A | 60 | 1.0 | 1.5 | 810 | 60 | 2.9 | 680 | 480 | 530 | 35 | 260 | 330 | 25 |
| 5 | A | 60 | 1.0 | 1.6 | 815 | 60 | 3.4 | 660 | 470 | 500 | 35 | 300 | 330 | 20 |
| 6 | A | 60 | 1.0 | 1.5 | 805 | 60 | 3.9 | 630 | 480 | 500 | 35 | 30 | 300 | 20 |
| 7 | A | 60 | 1.0 | 1.5 | 805 | 60 | 3.7 | 640 | 480 | 520 | 35 | 250 | 300 | 330 |
| 8 | A | 67 | 1.0 | 1.4 | 800 | 60 | 2.7 | 680 | 470 | 630 | 35 | 270 | 300 | 20 |
| 9 | A | 60 | 1.0 | 1.6 | 815 | 60 | 28.0 | 650 | 470 | 520 | 35 | 280 | 300 | 15 |
| 10 | A | 60 | 1.0 | 1.5 | 810 | 60 | 0.7 | 780 | 470 | 500 | 35 | 260 | 320 | 20 |
| 11 | A | 60 | 1.0 | 1.4 | 800 | 60 | 3.1 | 660 | 480 | 510 | 35 | 285 | 300 | 20 |
| 12 | A | 60 | 1.0 | 1.5 | 810 | 60 | 3.3 | 660 | 460 | none | 35 | 230 | 340 | 25 |
| 13 | B | 60 | 1.0 | 1.4 | 800 | 60 | 3.3 | 650 | 470 | 520 | 35 | 140 | 310 | 20 |
| 14 | B | 67 | 1.0 | 1.3 | 785 | 60 | 3.2 | 640 | 470 | 520 | 35 | 240 | 290 | 20 |
| 15 | B | 60 | 1.0 | 1.4 | 800 | 60 | 2.9 | 670 | 470 | 520 | 35 | 100 | 180 | 20 |
| 16 | B | 60 | 1.0 | 1.4 | 795 | 60 | 3.2 | 650 | 480 | none | 35 | 260 | 300 | 20 |

<Items in Table 7>
T5: Pre-plating temperature
T6: Alloying treatment temperature The tensile strength (TS), yield strength (YS), total elongation (El), hole expansion ratio (λ), ratio (R/t) between the sheet thickness t and the minimum bending radius R, area fractions of the steel micro-structure, as well as the values of sol. Bs/B and sol. Bq/B for the obtained cold-rolled steel sheets were measured by the same methods as in Example 1.

The results of these measurements are shown in Tables 8 and 9. Note that, in the present example the emphasis was placed on bendability, and the result was determined as being good in a case where the tensile strength was 980 MPa or more and the ratio R/t between the sheet thickness t and the minimum bending radius R was 2.5 or less.

TABLE 8

| Test No. | Steel | Microstructure of surface layer portion (vol. %) | | | | | Microstructure of inner portion (vol. %) | | | | |
|---|---|---|---|---|---|---|---|---|---|---|---|
| | | Vα | VB | VM | VTM/VM | Vγ | Vα | VB | VM | VTM/VM | Vγ |
| 1 | A | 74 | 7 | 15 | 71 | 3 | 28 | 25 | 42 | 72 | 4 |
| 2 | A | 27 | 30 | 39 | 65 | 3 | 31 | 36 | 30 | 74 | 2 |
| 3 | A | 26 | 30 | 40 | 67 | 3 | 31 | 20 | 45 | 73 | 3 |
| 4 | A | 25 | 30 | 42 | 67 | 2 | 33 | 27 | 37 | 66 | 2 |
| 5 | A | 75 | 9 | 14 | 62 | 1 | 77 | 16 | 4 | 75 | 2 |
| 6 | A | 70 | 0 | 29 | 90 | 0 | 28 | 0 | 71 | 90 | 0 |

TABLE 8-continued

| Test | | Microstructure of surface layer portion (vol. %) | | | | | Microstructure of inner portion (vol. %) | | | | |
|---|---|---|---|---|---|---|---|---|---|---|---|
| No. | Steel | Vα | VB | VM | VTM/VM | Vγ | Vα | VB | VM | VTM/VM | Vγ |
| 7 | A | 73 | 13 | 11 | 75 | 2 | 36 | 28 | 31 | 70 | 4 |
| 8 | A | 67 | 20 | 0 | 0 | 0 | 43 | 44 | 0 | 0 | 0 |
| 9 | A | 25 | 25 | 46 | 85 | 3 | 35 | 21 | 40 | 74 | 3 |
| 10 | A | 25 | 27 | 45 | 75 | 2 | 32 | 25 | 39 | 77 | 3 |
| 11 | A | 55 | 21 | 21 | 65 | 2 | 34 | 34 | 30 | 73 | 1 |
| 12 | A | 72 | 10 | 14 | 70 | 3 | 25 | 32 | 38 | 72 | 4 |
| 13 | B | 73 | 11 | 13 | 80 | 2 | 31 | 31 | 34 | 85 | 3 |
| 14 | B | 59 | 19 | 21 | 85 | 0 | 24 | 42 | 32 | 90 | 1 |
| 15 | B | 68 | 11 | 20 | 12 | 0 | 28 | 31 | 40 | 16 | 0 |
| 16 | B | 75 | 15 | 8 | 70 | 1 | 30 | 31 | 36 | 78 | 2 |

TABLE 9

| Test No. | Steel | Presence state of B | | | | Mechanical Properties | | | | | |
|---|---|---|---|---|---|---|---|---|---|---|---|
| | | sol. Bs (ppm) | sol. Bs/B | sol. Bq (ppm) | sol. Bq/B | YS (MPa) | TS (MPa) | El (%) | λ (%) | R/t | |
| 1 | A | 3 | 0.12 | 24 | 0.96 | 665 | 1029 | 17.2 | 35 | 0.5 | Inventive ex. |
| 2 | A | 23 | 0.92* | 23 | 0.92 | 700 | 1051 | 15.6 | 30 | 3.0 | Comparative |
| 3 | A | 21 | 0.84* | 24 | 0.96 | 699 | 1068 | 15.9 | 27 | 3.0 | example |
| 4 | A | 22 | 0.88* | 24 | 0.96 | 730 | 1044 | 16.0 | 29 | 3.0 | |
| 5 | A | 5 | 0.20 | 7 | 0.28* | 547 | 788 | 24.4 | 48 | 0.5 | |
| 6 | A | 5 | 0.20 | 24 | 0.96 | 721 | 1100 | 14.5 | 50 | 0.5 | Inventive |
| 7 | A | 3 | 0.12 | 24 | 0.96 | 612 | 1001 | 19.1 | 36 | 0.5 | example |
| 8 | A | 2 | 0.08 | 15 | 0.60 | 565 | 809 | 18.3 | 31 | 2.5 | |
| 9 | A | 3 | 0.12 | 25 | 1.00 | 767 | 1113 | 13.2 | 30 | 2.5 | |
| 10 | A | 3 | 0.12 | 25 | 1.00 | 738 | 1087 | 15.5 | 34 | 2.5 | |
| 11 | A | 9 | 0.36 | 24 | 0.96 | 683 | 1074 | 13.8 | 35 | 1.0 | |
| 12 | A | 3 | 0.12 | 24 | 0.96 | 651 | 1000 | 17.8 | 31 | 0.5 | |
| 13 | B | 4 | 0.17 | 22 | 0.96 | 741 | 1068 | 16.1 | 33 | 0.5 | |
| 14 | B | 8 | 0.35 | 22 | 0.96 | 704 | 1072 | 15.9 | 51 | 1.0 | |
| 15 | B | 3 | 0.13 | 23 | 1.00 | 626 | 1181 | 11.2 | 21 | 2.5 | |
| 16 | B | 3 | 0.13 | 23 | 1.00 | 652 | 1044 | 17.2 | 43 | 0.5 | |

*indicates that conditions do not satisfy those defined by the present invention.

In the example embodiments of the present invention in which the chemical composition and the presence state of B satisfied the ranges defined by the present invention, the results showed that the tensile strength was 980 MPa or more and the value of R/t was 2.5 or less, and the example embodiments thus had high strength and favorable bendability.

On the other hand, in comparative examples in which one of or both of the chemical composition and the presence state of B were outside the ranges defined by the present invention, the results showed that a tensile strength of 980 MPa or more or favorable bendability was not obtained.

Example 3

Steels having the chemical compositions shown in Table 10 were melted in a laboratory and ingots were cast. Thereafter, hot rolling was performed under the conditions shown in Table 11, and hot-rolled steel sheets having a thickness of 2.0 to 3.0 mm were obtained. Note that, the various conditions in the descaling process were the same as in Example 1. Thereafter, pickling was performed, followed by cold rolling with the rolling reductions shown in Table 12 to obtain cold-rolled steel sheets having a thickness of 1.0 mm. The obtained cold-rolled steel sheets were subjected to an annealing treatment under the conditions shown in Table 12.

TABLE 10

| | Chemical composition (by mass %, balance: Fe and impurities) | | | | | | | | | | | | |
|---|---|---|---|---|---|---|---|---|---|---|---|---|---|
| Steel | C | Si | Mn | Al | Ti | B | P | S | O | N | Cr | Mo | Ni |
| A | 0.220 | 1.12 | 1.97 | 0.033 | 0.025 | 0.0020 | 0.011 | 0.0020 | 0.0010 | 0.0037 | | | |
| B | 0.210 | 0.66 | 2.14 | 0.028 | 0.033 | 0.0022 | 0.010 | 0.0019 | 0.0017 | 0.0038 | | 0.12 | |
| C | 0.120 | 0.79 | 2.22 | 0.030 | 0.030 | 0.0021 | 0.012 | 0.0020 | 0.0009 | 0.0035 | | 0.18 | |
| D | 0.220 | 1.85 | 2.13 | 0.030 | 0.030 | 0.0020 | 0.009 | 0.0019 | 0.0014 | 0.0035 | | | |
| E | 0.220 | 0.53 | 2.28 | 0.029 | 0.031 | 0.0020 | 0.009 | 0.0020 | 0.0022 | 0.0034 | | | |
| F | 0.210 | 0.58 | 2.24 | 0.027 | 0.025 | 0.0020 | 0.008 | 0.0016 | 0.0009 | 0.0041 | | | 0.10 |

TABLE 10-continued

| | | | | | | | | | | | | |
|---|---|---|---|---|---|---|---|---|---|---|---|---|
| G | 0.190 | 0.50 | 2.88 | 0.031 | 0.030 | 0.0021 | 0.010 | 0.0020 | 0.0007 | 0.0031 | | |
| H | 0.230 | 0.22 | 2.50 | 0.240 | 0.029 | 0.0021 | 0.010 | 0.0019 | 0.0011 | 0.0039 | | |
| I | 0.320 | 1.79 | 2.12 | 0.031 | 0.028 | 0.0020 | 0.010 | 0.0022 | 0.0015 | 0.0036 | | |
| J | 0.270 | 1.84 | 1.98 | 0.027 | 0.031 | 0.0022 | 0.009 | 0.0018 | 0.0012 | 0.0044 | 0.24 | 0.10 |
| K | 0.220 | 0.63 | 2.11 | 0.031 | 0.033 | 0.0018 | 0.011 | 0.0020 | 0.0018 | 0.0035 | | |
| L | 0.210 | 0.74 | 2.07 | 0.025 | 0.026 | 0.0023 | 0.008 | 0.0016 | 0.0013 | 0.0046 | | |
| M | 0.200 | 0.49 | 2.15 | 0.030 | 0.032 | 0.0020 | 0.008 | 0.0019 | 0.0013 | 0.0040 | 0.32 | |
| N | 0.210 | 0.50 | 2.13 | 0.032 | 0.030 | 0.0017 | 0.010 | 0.0019 | 0.0010 | 0.0037 | | 0.30 |
| O | 0.180 | 0.54 | 2.25 | 0.030 | 0.030 | 0.0019 | 0.010 | 0.0018 | 0.0011 | 0.0036 | | |
| P | 0.210 | 0.50 | 2.41 | 0.029 | 0.030 | 0.0021 | 0.010 | 0.0019 | 0.0008 | 0.0039 | | |
| Q | 0.220 | 0.76 | 2.18 | 0.030 | 0.028 | 0.0022 | 0.013 | 0.0021 | 0.0015 | 0.0042 | | |
| R | 0.220 | 0.52 | 2.16 | 0.030 | 0.033 | 0.0020 | 0.011 | 0.0020 | 0.0005 | 0.0035 | | |
| S | 0.210 | 0.51 | 2.45 | 0.033 | 0.035 | 0.0020 | 0.011 | 0.0020 | 0.0012 | 0.0035 | | |
| T | 0.230 | 1.28 | 2.10 | 0.025 | 0.027 | 0.0021 | 0.010 | 0.0021 | 0.0005 | 0.0039 | | |
| U | 0.210 | 0.70 | 2.35 | 0.034 | 0.031 | 0.0018 | 0.012 | 0.0023 | 0.0018 | 0.0035 | | |
| V | 0.200 | 0.50 | 2.46 | 0.031 | 0.030 | 0.0019 | 0.009 | 0.0020 | 0.0008 | 0.0033 | | |
| W | 0.230 | 0.50 | 2.41 | 0.033 | 0.030 | 0.0003* | 0.010 | 0.0019 | 0.0014 | 0.0034 | | |
| X | 0.200 | 0.51 | 2.59 | 0.030 | 0.001* | 0.0020 | 0.010 | 0.0020 | 0.0009 | 0.0035 | | |
| Y | 0.250 | 0.59 | 0.67* | 0.030 | 0.030 | 0.0023 | 0.010 | 0.0019 | 0.0010 | 0.0041 | | |
| Z | 0.160 | 0.76 | 5.22* | 0.0034 | 0.028 | 0.0018 | 0.010 | 0.0020 | 0.0013 | 0.0036 | | |
| AA | 0.200 | 3.24* | 2.65 | 0.018 | 0.028 | 0.0019 | 0.010 | 0.0022 | 0.0009 | 0.0032 | | |
| AB | 0.080* | 0.55 | 2.63 | 0.030 | 0.030 | 0.0020 | 0.010 | 0.0020 | 0.0010 | 0.0033 | | |
| AC | 0.590* | 0.83 | 1.38 | 0.031 | 0.031 | 0.0020 | 0.010 | 0.0018 | 0.0017 | 0.0035 | | |

| | Chemical composition (by mass %, balance: Fe and impurities) | | | | | | | | | | $Ac_3$† | $Ms$‡ |
|---|---|---|---|---|---|---|---|---|---|---|---|---|
| Steel | Cu | Sn | Nb | V | W | Ca | Mg | Bi | Sb | Zr | REM | (° C.) | (° C.) |
| A | | | | | | | | | | | | 827 | 395 |
| B | | | | | | | | | | | | 804 | 391 |
| C | | | | | | | | | | | | 834 | 420 |
| D | | | | | | | | | | | | 852 | 388 |
| E | | | 0.032 | | | | | | | | | 788 | 383 |
| F | | | 0.029 | | | | | | | | | 795 | 387 |
| G | | | | | | | | | | | | 777 | 370 |
| H | | | | | | | | | | | | 850 | 377 |
| I | | | | | | | | | | | | 831 | 353 |
| J | | | | | | | | | | | | 845 | 371 |
| K | 0.27 | | | | | | | | | | | 794 | 387 |
| L | | 0.18 | | | | | | | | | | 804 | 394 |
| M | | | | | | | | | | | | 791 | 388 |
| N | | | | | | | | | | | | 791 | 387 |
| O | | | | 0.13 | 0.26 | | | | | | | 813 | 394 |
| P | | | | | | 0.0035 | | | | | | 786 | 381 |
| Q | | | | | | | | | | | 0.0038 | 804 | 386 |
| R | | | | 0.05 | | | 0.0044 | | | | | 798 | 385 |
| S | | | | | | | | 0.0037 | | | | 787 | 380 |
| T | | | | | | | | | 0.0600 | | | 824 | 386 |
| U | | | | | | | | | | 0.0053 | | 800 | 384 |
| V | | | | | | | | | | | 0.0110 | 786 | 383 |
| W | | | | | | | | | | | | 783 | 374 |
| X | | | | | | | | | | | | 783 | 378 |
| Y | | | | | | | | | | | | 834 | 435 |
| Z | | | | | | | | | | | | 727 | 290 |
| AA | | | | | | | | | | | | 899 | 375 |
| AB | | | | | | | | | | | | 817 | 419 |
| AC | | | | | | | | | | | | 769 | 284 |

*indicates that conditions do not satisfy those defined by the present invention.
†$Ac_3$ (° C.) = 910-203$C^{0.5}$ − 15.2Ni + 44.7Si + 104V + 31.5Mo − 30Mn − 11Cr − 20Cu + 700P + 400Al + 400Ti
‡$Ms$ (° C.) = 550-361C − 39Mn − 35V − 20Cr − 17Ni − 10Cu − 5Mo + 30Al

TABLE 11

| | | Hot Rolling Conditions | | | | | | | | | | |
|---|---|---|---|---|---|---|---|---|---|---|---|---|
| Test No. | Steel | SRT (° C.) | R1 (%) | R2 (%) | R3 (%) | Td (° C.) | FT (° C.) | Δt (s) | CR1 (° C./s) | CT (° C.) | tsc (µm) | Do × $10^{-6}$ | Thickness (mm) |
| 1 | A | 1250 | 75 | 86 | 15 | 990 | 950 | 3.1 | 35 | 600 | 7 | 188 | 2.5 |
| 2 | A | 1250 | 75 | 86 | 15 | 980 | 950 | 3.0 | 31 | 450 | 7 | 6 | 2.5 |
| 3 | A | 1250 | 75 | 86 | 15 | 1000 | 960 | 2.4 | 40 | 580 | 7 | 7 | 2.5 |
| 4 | A | 1250 | 75 | 86 | 15 | 870 | 870 | 4.3 | 47 | 620 | 2 | 177 | 2.5 |
| 5 | A | 1250 | 75 | 86 | 15 | 990 | 980 | 3.2 | 13 | 770 | 8 | 684 | 2.5 |
| 6 | A | 1250 | 75 | 86 | 15 | 980 | 900 | 2.3 | 27 | 570 | 6 | 180 | 2.5 |
| 7 | A | 1250 | 75 | 86 | 15 | 1010 | 950 | 3.2 | 27 | 590 | 6 | 136 | 2.5 |
| 8 | A | 1250 | 75 | 86 | 15 | 1040 | 950 | 3.4 | 30 | 620 | 8 | 308 | 3.0 |

TABLE 11-continued

| | | Hot Rolling Conditions | | | | | | | | | | | |
|---|---|---|---|---|---|---|---|---|---|---|---|---|---|
| Test No. | Steel | SRT (° C.) | R1 (%) | R2 (%) | R3 (%) | Td (° C.) | FT (° C.) | Δt (s) | CR1 (° C./s) | CT (° C.) | tsc (μm) | Do × 10⁻⁶ | Thickness (mm) |
| 9 | A | 1250 | 75 | 86 | 15 | 1000 | 960 | 3.2 | 24 | 600 | 7 | 156 | 2.5 |
| 10 | A | 1250 | 75 | 86 | 15 | 1010 | 950 | 3.6 | 22 | 590 | 8 | 165 | 2.5 |
| 11 | A | 1250 | 75 | 86 | 15 | 970 | 940 | 2.8 | 38 | 550 | 6 | 30 | 2.5 |
| 12 | A | 1250 | 75 | 86 | 15 | 590 | 950 | 3.3 | 35 | 680 | 8 | 1712 | 2.5 |
| 13 | B | 1250 | 75 | 86 | 15 | 980 | 950 | 2.6 | 25 | 610 | 6 | 194 | 2.5 |
| 14 | C | 1250 | 75 | 86 | 15 | 980 | 970 | 4.6 | 19 | 630 | 5 | 308 | 2.5 |
| 15 | D | 1250 | 75 | 86 | 15 | 990 | 950 | 1.7 | 30 | 650 | 8 | 390 | 2.0 |
| 16 | D | 1250 | 75 | 86 | 15 | 980 | 940 | 2.9 | 33 | 590 | 8 | 103 | 2.0 |
| 17 | D | 1250 | 75 | 86 | 15 | 980 | 950 | 3.8 | 36 | 620 | 8 | 181 | 2.0 |
| 18 | E | 1250 | 75 | 86 | 15 | 990 | 950 | 3.6 | 31 | 580 | 6 | 133 | 2.5 |
| 19 | E | 1250 | 75 | 86 | 15 | 980 | 940 | 4.0 | 20 | 580 | 7 | 50 | 2.5 |
| 20 | E | 1250 | 75 | 86 | 15 | 980 | 950 | 3.1 | 25 | 580 | 7 | 6 | 2.5 |
| 21 | F | 1250 | 75 | 86 | 15 | 1020 | 900 | 2.5 | 30 | 600 | 10 | 76 | 3.0 |
| 22 | G | 1250 | 75 | 86 | 15 | 1000 | 990 | 3.9 | 23 | 540 | 9 | 117 | 2.5 |
| 23 | H | 1250 | 75 | 86 | 15 | 1000 | 930 | 4.2 | 41 | 640 | 7 | 407 | 2.5 |
| 24 | I | 1250 | 75 | 86 | 15 | 1030 | 970 | 1.9 | 33 | 640 | 9 | 115 | 2.0 |
| 25 | I | 1250 | 75 | 86 | 15 | 980 | 960 | 3.2 | 35 | 650 | 10 | 464 | 2.0 |
| 26 | I | 1250 | 75 | 86 | 15 | 1000 | 970 | 2.2 | 36 | 650 | 8 | 563 | 2.0 |
| 27 | J | 1250 | 75 | 86 | 15 | 1020 | 950 | 2.2 | 29 | 650 | 7 | 438 | 2.0 |
| 28 | K | 1250 | 75 | 86 | 15 | 960 | 910 | 2.8 | 36 | 590 | 6 | 95 | 2.5 |
| 29 | L | 1250 | 75 | 86 | 15 | 990 | 930 | 2.4 | 37 | 610 | 6 | 142 | 2.5 |
| 30 | M | 1250 | 75 | 86 | 15 | 990 | 930 | 3.0 | 42 | 620 | 8 | 51 | 2.5 |
| 31 | N | 1250 | 75 | 86 | 15 | 1010 | 970 | 4.5 | 24 | 660 | 7 | 690 | 2.5 |
| 32 | O | 1250 | 75 | 86 | 15 | 970 | 890 | 4.5 | 44 | 630 | 8 | 262 | 2.0 |
| 33 | P | 1250 | 75 | 86 | 15 | 1010 | 950 | 2.6 | 25 | 610 | 6 | 105 | 2.5 |
| 34 | Q | 1250 | 75 | 86 | 15 | 1000 | 950 | 4.1 | 39 | 600 | 7 | 126 | 2.5 |
| 35 | R | 1250 | 75 | 86 | 15 | 1050 | 1000 | 2.8 | 33 | 570 | 10 | 37 | 2.5 |
| 36 | S | 1250 | 75 | 86 | 15 | 1030 | 990 | 2.0 | 50 | 630 | 5 | 100 | 2.5 |
| 37 | T | 1250 | 75 | 86 | 15 | 970 | 930 | 3.4 | 17 | 650 | 7 | 238 | 2.5 |
| 38 | U | 1250 | 75 | 86 | 15 | 1070 | 1000 | 2.6 | 35 | 600 | 12 | 57 | 2.5 |
| 39 | V | 1250 | 75 | 86 | 15 | 990 | 920 | 4.6 | 44 | 580 | 9 | 119 | 2.5 |
| 40 | W* | 1250 | 75 | 86 | 15 | 1020 | 890 | 3.3 | 24 | 600 | 8 | 180 | 2.5 |
| 41 | X* | 1250 | 75 | 86 | 15 | 1000 | 950 | 4.0 | 48 | 620 | 8 | 185 | 2.5 |
| 42 | Y* | 1250 | 75 | 86 | 15 | 1000 | 930 | 3.5 | 22 | 600 | 7 | 104 | 2.0 |
| 43 | Z* | 1250 | 75 | 86 | 15 | 980 | 900 | 3.1 | 37 | 610 | 5 | 223 | 2.5 |
| 44 | AA* | 1250 | 75 | 86 | 15 | 990 | 900 | 4.2 | 27 | 600 | 6 | 149 | 2.5 |
| 45 | AB* | 1250 | 75 | 86 | 15 | 970 | 960 | 3.7 | 29 | 640 | 7 | 401 | 2.5 |
| 46 | AC* | 1250 | 75 | 86 | 15 | 1010 | 900 | 2.2 | 41 | 630 | 9 | 277 | 2.0 |

*indicates that conditions do not satisfy those defined by the present invention.

TABLE 12

| | | Cold Rolling Conditions | | Annealing Conditions | | | | | | | | |
|---|---|---|---|---|---|---|---|---|---|---|---|---|
| Test No. | Steel | Cold-rolling rate (%) | Thickness (mm) | HR (° C./s) | TI (° C.) | t1 (s) | CR2 (° C./s) | T2 (° C.) | CR3 (° C./s) | T3 (° C.) | T4 (° C.) | t2 (s) |
| 1 | A | 60 | 1.0 | 1.2 | 840 | 104 | 3.2 | 650 | 50 | 250 | 280 | 345 |
| 2 | A | 60 | 1.0 | 1.2 | 840 | 104 | 3.1 | 655 | 50 | 260 | 285 | 270 |
| 3 | A | 60 | 1.0 | 1.2 | 845 | 104 | 3.3 | 650 | 50 | 240 | 285 | 330 |
| 4 | A | 60 | 1.0 | 1.2 | 840 | 104 | 3.2 | 650 | 50 | 260 | 320 | 315 |
| 5 | A | 60 | 1.0 | 1.2 | 850 | 104 | 3.5 | 640 | 50 | 245 | 290 | 295 |
| 6 | A | 60 | 1.0 | 1.0 | 815 | 104 | 2.7 | 655 | 50 | 250 | 250 | 260 |
| 7 | A | 60 | 1.0 | 1.2 | 845 | 104 | 3.4 | 640 | 50 | 320 | 320 | 70 |
| 8 | A | 67 | 1.0 | 1.2 | 850 | 104 | 34.0 | 650 | 50 | 240 | 270 | 275 |
| 9 | A | 60 | 1.0 | 1.2 | 840 | 104 | 3.2 | 650 | 50 | 120 | 300 | 250 |
| 10 | A | 60 | 1.0 | 1.2 | 850 | 104 | 1.2 | 780 | 50 | 270 | 290 | 415 |
| 11 | A | 60 | 1.0 | 1.2 | 850 | 104 | 3.3 | 650 | 50 | 250 | 290 | 340 |
| 12 | A | 60 | 1.0 | 1.2 | 845 | 104 | 3.3 | 645 | 50 | 240 | 295 | 310 |
| 13 | B | 60 | 1.0 | 1.0 | 815 | 104 | 2.9 | 640 | 50 | 260 | 285 | 425 |
| 14 | C | 60 | 1.0 | 1.2 | 850 | 104 | 3.3 | 650 | 50 | 300 | 300 | 355 |
| 15 | D | 50 | 1.0 | 1.3 | 860 | 104 | 3.5 | 650 | 50 | 300 | 320 | 390 |
| 16 | D | 50 | 1.0 | 1.3 | 865 | 104 | 3.8 | 640 | 50 | 250 | 310 | 320 |
| 17 | D | 50 | 1.0 | 1.1 | 830 | 104 | 2.8 | 660 | 50 | 280 | 310 | 330 |
| 18 | E | 60 | 1.0 | 1.0 | 815 | 104 | 2.9 | 640 | 50 | 270 | 270 | 280 |
| 19 | E | 60 | 1.0 | 0.8 | 780 | 104 | 2.0 | 660 | 50 | 260 | 270 | 300 |
| 20 | E | 60 | 1.0 | 1.0 | 820 | 104 | 2.9 | 645 | 50 | 280 | 280 | 330 |
| 21 | F | 67 | 1.0 | 1.0 | 815 | 104 | 3.3 | 620 | 50 | 250 | 280 | 315 |
| 22 | G | 60 | 1.0 | 0.9 | 800 | 104 | 3.3 | 600 | 50 | 250 | 280 | 365 |
| 23 | H | 60 | 1.0 | 1.3 | 865 | 104 | 3.6 | 650 | 50 | 240 | 280 | 300 |
| 24 | I | 50 | 1.0 | 1.2 | 850 | 104 | 3.5 | 640 | 50 | 260 | 385 | 400 |

TABLE 12-continued

|  |  | Cold Rolling Conditions | | Annealing Conditions | | | | | | | | |
|---|---|---|---|---|---|---|---|---|---|---|---|---|
| Test No. | Steel | Cold-rolling rate (%) | Thickness (mm) | HR (° C./s) | TI (° C.) | t1 (s) | CR2 (° C./s) | T2 (° C.) | CR3 (° C./s) | T3 (° C.) | T4 (° C.) | t2 (s) |
| 25 | I | 50 | 1.0 | 1.2 | 850 | 104 | 3.3 | 650 | 50 | 330 | 380 | 440 |
| 26 | I | 50 | 1.0 | 1.2 | 850 | 104 | 3.6 | 635 | 50 | 180 | 390 | 360 |
| 27 | J | 50 | 1.0 | 1.3 | 865 | 104 | 3.5 | 655 | 50 | 270 | 340 | 350 |
| 28 | K | 60 | 1.0 | 0.9 | 805 | 104 | 2.8 | 640 | 50 | 280 | 290 | 430 |
| 29 | L | 60 | 1.0 | 1.0 | 815 | 104 | 2.9 | 640 | 50 | 250 | 250 | 330 |
| 30 | M | 60 | 1.0 | 0.9 | 800 | 104 | 2.8 | 630 | 50 | 280 | 305 | 270 |
| 31 | N | 60 | 1.0 | 1.0 | 810 | 104 | 2.7 | 650 | 50 | 250 | 270 | 330 |
| 32 | O | 50 | 1.0 | 1.1 | 825 | 104 | 2.9 | 650 | 50 | 240 | 280 | 280 |
| 33 | P | 60 | 1.0 | 0.9 | 800 | 104 | 2.3 | 660 | 50 | 255 | 275 | 300 |
| 34 | Q | 60 | 1.0 | 1.0 | 820 | 104 | 3.0 | 640 | 50 | 260 | 285 | 300 |
| 35 | R | 60 | 1.0 | 1.0 | 810 | 104 | 2.3 | 670 | 50 | 250 | 270 | 310 |
| 36 | S | 60 | 1.0 | 0.9 | 800 | 104 | 2.8 | 630 | 50 | 270 | 270 | 345 |
| 37 | T | 60 | 1.0 | 1.2 | 840 | 104 | 3.3 | 640 | 50 | 300 | 340 | 190 |
| 38 | U | 60 | 1.0 | 1.0 | 815 | 104 | 2.6 | 660 | 50 | 250 | 265 | 320 |
| 39 | V | 60 | 1.0 | 1.0 | 820 | 104 | 2.7 | 660 | 50 | 220 | 235 | 225 |
| 40 | W* | 60 | 1.0 | 0.9 | 795 | 104 | 2.4 | 650 | 50 | 250 | 260 | 245 |
| 41 | X* | 60 | 1.0 | 0.9 | 800 | 104 | 2.2 | 670 | 50 | 250 | 270 | 330 |
| 42 | Y* | 50 | 1.0 | 1.2 | 850 | 104 | 3.5 | 640 | 50 | 250 | 250 | 370 |
| 43 | Z* | 60 | 1.0 | 0.7 | 770 | 104 | 2.0 | 650 | 50 | 250 | 290 | 425 |
| 44 | AA* | 60 | 1.0 | 1.6 | 910 | 104 | 4.3 | 650 | 50 | 260 | 280 | 310 |
| 45 | AB* | 60 | 1.0 | 1.1 | 830 | 104 | 3.0 | 650 | 50 | 230 | 230 | 215 |
| 46 | AC* | 50 | 1.0 | 0.9 | 800 | 104 | 3.0 | 620 | 50 | 230 | 270 | 315 |

*indicates that conditions do not satisfy those defined by the present invention.

The tensile strength (TS), yield strength (YS), total elongation (El), hole expansion ratio (λ), ratio (R/t) between the sheet thickness t and the minimum bending radius R, area fractions of the steel micro-structure, as well as the values of sol. Bs/B and sol. Bq/B for the obtained cold-rolled steel sheets were measured by the same methods as in Example 1.

The results of these measurements are shown in Tables 13 and 14. Note that, in the present example the emphasis was placed on strength, and the result was determined as being good in a case where the tensile strength was 1180 MPa or more and the ratio R/t between the sheet thickness t and the minimum bending radius R was 3.5 or less.

TABLE 13

| Test No. | Steel | Microstructure of surface layer portion (vol. %) | | | | | Microstructure of inner portion (vol. %) | | | | |
|---|---|---|---|---|---|---|---|---|---|---|---|
| | | Vα | VB | VM | VTM/VM | Vγ | Vα | VB | VM | VTM/VM | Vγ |
| 1 | A | 53 | 16 | 26 | 85 | 4 | 0 | 9 | 87 | 90 | 3 |
| 2 | A | 3 | 13 | 79 | 80 | 4 | 0 | 11 | 84 | 85 | 4 |
| 3 | A | 5 | 8 | 83 | 90 | 3 | 0 | 5 | 91 | 90 | 3 |
| 4 | A | 5 | 6 | 84 | 95 | 4 | 0 | 6 | 90 | 100 | 3 |
| 5 | A | 52 | 12 | 30 | 65 | 5 | 34 | 9 | 51 | 65 | 5 |
| 6 | A | 59 | 12 | 24 | 60 | 4 | 11 | 13 | 70 | 65 | 5 |
| 7 | A | 54 | 19 | 20 | 60 | 6 | 0 | 28 | 66 | 55 | 5 |
| 8 | A | 8 | 5 | 82 | 75 | 4 | 0 | 5 | 90 | 75 | 4 |
| 9 | A | 55 | 0 | 42 | 95 | 2 | 0 | 0 | 96 | 95 | 3 |
| 10 | A | 7 | 9 | 80 | 85 | 3 | 0 | 8 | 89 | 80 | 2 |
| 11 | A | 27 | 18 | 50 | 80 | 4 | 0 | 10 | 85 | 85 | 4 |
| 12 | A | 60 | 19 | 17 | 60 | 3 | 46 | 20 | 30 | 60 | 3 |
| 13 | B | 55 | 6 | 35 | 75 | 3 | 0 | 10 | 86 | 80 | 3 |
| 14 | C | 54 | 10 | 32 | 80 | 3 | 0 | 12 | 85 | 90 | 2 |
| 15 | D | 56 | 11 | 25 | 75 | 7 | 0 | 20 | 71 | 70 | 8 |
| 16 | D | 53 | 7 | 31 | 80 | 8 | 0 | 7 | 85 | 80 | 7 |
| 17 | D | 62 | 5 | 24 | 60 | 8 | 15 | 10 | 66 | 55 | 8 |
| 18 | E | 55 | 9 | 33 | 75 | 2 | 0 | 8 | 88 | 85 | 3 |
| 19 | E | 44 | 13 | 40 | 55 | 2 | 13 | 8 | 76 | 55 | 2 |
| 20 | E | 28 | 13 | 55 | 55 | 3 | 0 | 6 | 90 | 60 | 3 |
| 21 | F | 48 | 10 | 39 | 75 | 2 | 0 | 5 | 92 | 80 | 2 |
| 22 | G | 52 | 0 | 43 | 80 | 4 | 0 | 0 | 95 | 90 | 4 |
| 23 | H | 60 | 6 | 30 | 80 | 3 | 0 | 12 | 85 | 80 | 2 |
| 24 | I | 51 | 9 | 24 | 80 | 15 | 0 | 23 | 60 | 85 | 16 |
| 25 | I | 58 | 13 | 13 | 55 | 15 | 0 | 24 | 60 | 55 | 15 |
| 26 | I | 60 | 5 | 22 | 90 | 12 | 0 | 10 | 76 | 90 | 13 |
| 27 | J | 55 | 8 | 26 | 80 | 10 | 0 | 15 | 73 | 80 | 11 |
| 28 | K | 55 | 15 | 25 | 80 | 4 | 0 | 10 | 85 | 80 | 4 |
| 29 | L | 60 | 9 | 26 | 85 | 4 | 0 | 11 | 82 | 85 | 6 |
| 30 | M | 47 | 9 | 40 | 70 | 3 | 0 | 8 | 88 | 75 | 3 |
| 31 | N | 62 | 10 | 23 | 75 | 4 | 0 | 15 | 80 | 80 | 4 |
| 32 | O | 57 | 5 | 34 | 70 | 3 | 0 | 11 | 85 | 70 | 3 |

TABLE 13-continued

| Test No. | Steel | Microstructure of surface layer portion (vol. %) | | | | | Microstructure of inner portion (vol. %) | | | | |
|---|---|---|---|---|---|---|---|---|---|---|---|
| | | Vα | VB | VM | VTM/VM | Vγ | Vα | VB | VM | VTM/VM | Vγ |
| 33 | P | 51 | 5 | 40 | 75 | 3 | 0 | 8 | 87 | 75 | 4 |
| 34 | Q | 56 | 8 | 30 | 80 | 5 | 0 | 18 | 76 | 80 | 5 |
| 35 | R | 45 | 18 | 32 | 80 | 4 | 0 | 10 | 85 | 85 | 4 |
| 36 | S | 58 | 9 | 28 | 80 | 4 | 0 | 16 | 80 | 85 | 3 |
| 37 | T | 51 | 20 | 21 | 60 | 7 | 0 | 27 | 65 | 60 | 7 |
| 38 | U | 55 | 11 | 30 | 80 | 3 | 0 | 11 | 85 | 80 | 3 |
| 39 | V | 54 | 4 | 40 | 70 | 1 | 0 | 8 | 90 | 75 | 1 |
| 40 | W* | 64 | 13 | 20 | 65 | 2 | 18 | 41 | 38 | 70 | 2 |
| 41 | X* | 58 | 15 | 24 | 70 | 2 | 25 | 39 | 33 | 70 | 2 |
| 42 | Y* | 64 | 11 | 5 | — | 0 | 39 | 27 | 32 | 80 | 1 |
| 43 | Z* | 0 | 0 | 94 | 40 | 5 | 0 | 0 | 94 | 35 | 5 |
| 44 | AA* | 27 | 5 | 60 | 40 | 7 | 0 | 9 | 84 | 35 | 6 |
| 45 | AB* | 73 | 5 | 21 | 90 | 0 | 0 | 9 | 90 | 95 | 0 |
| 46 | AC* | 39 | 14 | 33 | 30 | 13 | 0 | 20 | 64 | 30 | 15 |

*indicates that conditions do not satisfy those defined by the present invention.

TABLE 14

| Test No. | Steel | Presence state of B | | | | Mechanical Properties | | | | | |
|---|---|---|---|---|---|---|---|---|---|---|---|
| | | sol. Bs (ppm) | sol. Bs/B | sol. Bq (ppm) | sol. Bq/B | YS (MPa) | TS (MPa) | El (%) | λ (%) | R/t | |
| 1 | A | 3 | 0.15 | 20 | 1.00 | 1102 | 1496 | 9.0 | 40 | 2.0 | Inventive ex. |
| 2 | A | 19 | 0.95* | 20 | 1.00 | 1138 | 1537 | 8.6 | 42 | 4.5 | Comparative |
| 3 | A | 19 | 0.95* | 20 | 1.00 | 1184 | 1552 | 8.8 | 37 | 4.5 | example |
| 4 | A | 19 | 0.95* | 20 | 1.00 | 1181 | 1476 | 8.3 | 39 | 4.5 | |
| 5 | A | 2 | 0.10 | 7 | 0.35* | 806 | 1152 | 12.6 | 32 | 1.0 | |
| 6 | A | 2 | 0.10 | 19 | 0.95 | 1015 | 1483 | 11.0 | 23 | 3.0 | Inventive |
| 7 | A | 3 | 0.15 | 20 | 1.00 | 1083 | 1584 | 9.6 | 28 | 3.0 | example |
| 8 | A | 2 | 0.10 | 19 | 0.95 | 1106 | 1539 | 8.2 | 38 | 3.5 | |
| 9 | A | 4 | 0.20 | 19 | 0.95 | 1239 | 1501 | 8.0 | 46 | 2.0 | |
| 10 | A | 3 | 0.15 | 20 | 1.00 | 1114 | 1545 | 8.5 | 40 | 3.5 | |
| 11 | A | 8 | 0.40 | 20 | 1.00 | 1123 | 1515 | 9.1 | 43 | 3.0 | |
| 12 | A | 2 | 0.10 | 5 | 0.25 | 732 | 1139 | 12.2 | 26 | 1.0 | Comp. ex. |
| 13 | B | 3 | 0.14 | 21 | 0.95 | 1099 | 1528 | 8.4 | 44 | 2.0 | Inventive |
| 14 | C | 3 | 0.14 | 20 | 0.95 | 1047 | 1340 | 8.7 | 46 | 2.0 | example |
| 15 | D | 3 | 0.15 | 19 | 0.95 | 1017 | 1486 | 10.8 | 32 | 2.0 | |
| 16 | D | 2 | 0.10 | 20 | 1.00* | 1062 | 1504 | 10.1 | 35 | 2.0 | |
| 17 | D | 3 | 0.15 | 20 | 1.00 | 992 | 1520 | 12.5 | 21 | 3.0 | |
| 18 | E | 2 | 0.10 | 19 | 0.95 | 1107 | 1533 | 8.9 | 36 | 2.0 | |
| 19 | E | 3 | 0.15 | 20 | 1.00 | 1074 | 1569 | 10.6 | 35 | 3.0 | |
| 20 | E | 3 | 0.15 | 20 | 1.00 | 1098 | 1521 | 8.4 | 39 | 3.0 | |
| 21 | F | 2 | 0.10 | 20 | 1.00 | 1071 | 1488 | 9.2 | 36 | 2.0 | |
| 22 | G | 2 | 0.10 | 19 | 0.90 | 1049 | 1477 | 9.4 | 35 | 2.0 | |
| 23 | H | 3 | 0.14 | 21 | 1.00 | 1129 | 1584 | 8.2 | 33 | 2.0 | |
| 24 | I | 3 | 0.15 | 20 | 1.00 | 1074 | 1496 | 17.5 | 31 | 2.0 | |
| 25 | I | 1 | 0.05 | 19 | 0.95 | 977 | 1558 | 16.2 | 14 | 3.0 | |
| 26 | I | 2 | 0.10 | 19 | 0.95 | 1165 | 1482 | 17.0 | 36 | 2.0 | |
| 27 | J | 3 | 0.14 | 20 | 0.91 | 1101 | 1500 | 14.9 | 40 | 2.0 | |
| 28 | K | 3 | 0.17 | 17 | 0.94 | 1091 | 1506 | 8.5 | 38 | 2.0 | |
| 29 | L | 4 | 0.17 | 22 | 0.96 | 1069 | 1517 | 8.0 | 39 | 2.0 | |
| 30 | M | 4 | 0.20 | 19 | 0.95 | 1086 | 1482 | 8.3 | 41 | 2.5 | |
| 31 | N | 2 | 0.12 | 15 | 0.88 | 1075 | 1513 | 8.7 | 37 | 2.0 | |
| 32 | O | 3 | 0.16 | 19 | 1.00 | 1058 | 1493 | 8.0 | 45 | 2.0 | |
| 33 | P | 3 | 0.14 | 20 | 0.95 | 1064 | 1509 | 8.5 | 36 | 2.0 | |
| 34 | Q | 3 | 0.14 | 20 | 0.91 | 1093 | 1516 | 8.3 | 37 | 2.0 | |
| 35 | R | 6 | 0.30 | 20 | 1.00 | 1116 | 1511 | 8.4 | 35 | 2.0 | |
| 36 | S | 2 | 0.10 | 20 | 1.00 | 1087 | 1509 | 8.8 | 40 | 2.0 | |
| 37 | T | 4 | 0.19 | 20 | 0.95 | 1072 | 1491 | 10.2 | 35 | 2.5 | |
| 38 | U | 2 | 0.11 | 17 | 0.94 | 1100 | 1522 | 9.0 | 42 | 2.0 | |
| 39 | V | 2 | 0.11 | 19 | 1.00 | 1066 | 1504 | 8.6 | 35 | 2.0 | |
| 40 | W* | 0 | 0.00 | 3 | 1.00 | 721 | 1158 | 11.4 | 31 | 3.0 | Comparative |
| 41 | X* | 3 | 0.15 | 6 | 0.30 | 719 | 1165 | 12.3 | 33 | 3.0 | example |
| 42 | Y* | 3 | 0.13 | 19 | 0.83 | 751 | 1088 | 14.0 | 27 | 2.5 | |
| 43 | Z* | 2 | 0.11 | 18 | 1.00 | 982 | 1504 | 7.7 | 10 | 5.0 | |
| 44 | AA* | 3 | 0.16 | 18 | 0.95 | 956 | 1483 | 9.5 | 12 | 5.0 | |
| 45 | AB* | 1 | 0.05 | 20 | 1.00 | 721 | 1083 | 9.2 | 58 | 1.0 | |
| 46 | AC* | 2 | 0.10 | 19 | 0.95* | 1109 | 1706 | 10.6 | 8 | 5.0 | |

*indicates that conditions do not satisfy those defined by the present invention.

In the example embodiments of the present invention in which the chemical composition and the presence state of B satisfied the ranges defined by the present invention, the results showed that the tensile strength was 1180 MPa or more and the value of R/t was 3.5 or less, and the example embodiments thus had high strength and favorable bendability.

On the other hand, in comparative examples in which one of or both of the chemical composition and the presence state of B were outside the ranges defined by the present invention, the results showed that a tensile strength of 1180 MPa or more or favorable bendability was not obtained.

Example 4

Among the steels having the chemical compositions shown in Table 10, steels A, B, C, D, F, I and J were melted in a laboratory and ingots were cast. Thereafter, hot rolling was performed under the conditions shown in Table 15, and hot-rolled steel sheets having a thickness of 2.0 to 3.0 mm were obtained. Note that, the various conditions in the descaling process were the same as in Example 1. Thereafter, pickling was performed, followed by cold rolling with the rolling reductions shown in Table 16 to obtain cold-rolled steel sheets having a thickness of 1.0 mm. The obtained cold-rolled steel sheets were subjected to a heat treatment that simulated a continuous hot dip galvanization line under the conditions shown in Table 16.

TABLE 15

| | | Hot Rolling Conditions | | | | | | | | | | | |
|---|---|---|---|---|---|---|---|---|---|---|---|---|---|
| Test No. | Steel | SRT (°C.) | R1 (%) | R2 (%) | R3 (%) | Td (°C.) | FT (°C.) | Δt (s) | CR1 (°C./s) | CT (°C.) | tsc (μm) | Do × $10^{-6}$ | Thickness (mm) |
| 1 | A | 1250 | 75 | 86 | 15 | 990 | 950 | 3.1 | 35 | 600 | 7 | 188 | 2.5 |
| 2 | A | 1250 | 75 | 86 | 15 | 980 | 950 | 3.0 | 31 | 450 | 7 | 6 | 2.5 |
| 3 | A | 1250 | 75 | 86 | 15 | 1000 | 960 | 2.4 | 40 | 580 | 7 | 7 | 2.5 |
| 4 | A | 1250 | 75 | 86 | 15 | 870 | 870 | 4.3 | 47 | 620 | 2 | 177 | 2.5 |
| 5 | A | 1250 | 75 | 86 | 15 | 990 | 980 | 3.2 | 13 | 770 | 8 | 684 | 2.5 |
| 6 | A | 1250 | 75 | 86 | 15 | 980 | 900 | 2.3 | 27 | 570 | 6 | 180 | 2.5 |
| 7 | A | 1250 | 75 | 86 | 15 | 1010 | 950 | 3.2 | 27 | 590 | 6 | 136 | 2.5 |
| 8 | A | 1250 | 75 | 86 | 15 | 1040 | 950 | 3.4 | 30 | 620 | 8 | 308 | 3.0 |
| 9 | A | 1250 | 75 | 86 | 15 | 1000 | 960 | 3.2 | 24 | 600 | 7 | 156 | 2.5 |
| 10 | A | 1250 | 75 | 86 | 15 | 1010 | 950 | 3.6 | 22 | 590 | 8 | 165 | 2.5 |
| 11 | A | 1250 | 75 | 86 | 15 | 970 | 940 | 2.8 | 38 | 550 | 6 | 30 | 2.5 |
| 12 | A | 1250 | 75 | 86 | 15 | 990 | 950 | 3.1 | 35 | 600 | 7 | 188 | 2.5 |
| 13 | B | 1250 | 75 | 86 | 15 | 980 | 950 | 2.6 | 25 | 610 | 6 | 194 | 2.5 |
| 14 | B | 1250 | 75 | 86 | 15 | 1000 | 960 | 3.0 | 35 | 580 | 7 | 145 | 2.5 |
| 15 | B | 1250 | 75 | 86 | 15 | 990 | 950 | 4.4 | 31 | 620 | 7 | 267 | 2.5 |
| 16 | B | 1250 | 75 | 86 | 15 | 1010 | 980 | 3.5 | 40 | 570 | 7 | 100 | 3.0 |
| 17 | C | 1250 | 75 | 86 | 15 | 980 | 970 | 4.6 | 19 | 630 | 5 | 308 | 2.5 |
| 18 | D | 1250 | 75 | 86 | 15 | 990 | 950 | 1.7 | 30 | 650 | 8 | 390 | 2.0 |
| 19 | F | 1250 | 75 | 86 | 15 | 1020 | 900 | 2.5 | 30 | 600 | 10 | 76 | 3.0 |
| 20 | I | 1250 | 75 | 86 | 15 | 1030 | 1020 | 1.9 | 33 | 640 | 9 | 115 | 2.0 |
| 21 | J | 1250 | 75 | 86 | 15 | 1020 | 950 | 2.2 | 29 | 650 | 7 | 438 | 2.0 |

TABLE 16

| | | Cold Rolling Conditions | | Annealing Conditions | | | | | | | | | |
|---|---|---|---|---|---|---|---|---|---|---|---|---|---|
| Test No. | Steel | Cold-rolling rate (%) | Thickness (mm) | HR (°C./s) | T1 (°C.) | t1 (s) | CR2 (°C./s) | T2 (°C.) | T5 (°C.) | T6 (°C.) | CR3 (°C./s) | T3 (°C.) | T4 (°C.) | t2 (s) |
| 1 | A | 60 | 1.0 | 1.8 | 840 | 72 | 4.2 | 650 | 475 | 530 | 38 | 230 | 290 | 30 |
| 2 | A | 60 | 1.0 | 1.9 | 845 | 72 | 4.3 | 650 | 480 | 520 | 38 | 230 | 285 | 20 |
| 3 | A | 60 | 1.0 | 1.8 | 840 | 72 | 4.2 | 650 | 470 | 530 | 38 | 235 | 290 | 20 |
| 4 | A | 60 | 1.0 | 1.8 | 835 | 72 | 4.3 | 640 | 480 | 530 | 38 | 225 | 290 | 25 |
| 5 | A | 60 | 1.0 | 1.9 | 845 | 72 | 4.1 | 660 | 470 | 520 | 38 | 220 | 285 | 20 |
| 6 | A | 60 | 1.0 | 1.8 | 840 | 72 | 4.7 | 630 | 480 | 520 | 38 | 30 | 300 | 20 |
| 7 | A | 60 | 1.0 | 1.8 | 840 | 72 | 4.4 | 640 | 480 | 520 | 38 | 220 | 280 | 330 |
| 8 | A | 67 | 1.0 | 1.8 | 840 | 72 | 4.0 | 660 | 475 | 630 | 38 | 240 | 290 | 20 |
| 9 | A | 60 | 1.0 | 1.8 | 840 | 72 | 28.0 | 660 | 480 | 530 | 38 | 220 | 280 | 20 |
| 10 | A | 60 | 1.0 | 1.8 | 840 | 72 | 1.3 | 780 | 470 | 520 | 38 | 240 | 285 | 20 |
| 11 | A | 60 | 1.0 | 1.8 | 840 | 72 | 4.2 | 650 | 480 | 530 | 38 | 230 | 290 | 20 |
| 12 | A | 60 | 1.0 | 1.8 | 840 | 72 | 4.4 | 640 | 475 | none | 38 | 230 | 290 | 25 |
| 13 | B | 60 | 1.0 | 1.6 | 815 | 72 | 3.9 | 640 | 470 | 530 | 38 | 230 | 285 | 30 |
| 14 | B | 60 | 1.0 | 1.7 | 825 | 72 | 3.9 | 650 | 470 | 530 | 38 | 120 | 160 | 35 |
| 15 | B | 60 | 1.0 | 1.4 | 795 | 72 | 3.2 | 650 | 480 | 520 | 38 | 230 | 285 | 30 |
| 16 | B | 67 | 1.0 | 1.6 | 820 | 72 | 3.8 | 650 | 465 | none | 38 | 235 | 290 | 20 |
| 17 | C | 60 | 1.0 | 1.9 | 845 | 72 | 4.6 | 640 | 480 | 510 | 38 | 230 | 270 | 20 |
| 18 | D | 50 | 1.0 | 2.0 | 860 | 72 | 4.7 | 650 | 475 | 540 | 38 | 240 | 300 | 165 |
| 19 | F | 67 | 1.0 | 1.5 | 810 | 72 | 3.6 | 650 | 470 | 510 | 38 | 290 | 290 | 30 |
| 20 | I | 50 | 1.0 | 2.0 | 855 | 72 | 4.6 | 650 | 470 | 550 | 38 | 240 | 390 | 180 |
| 21 | J | 50 | 1.0 | 2.0 | 860 | 72 | 4.7 | 650 | 480 | 550 | 38 | 250 | 360 | 170 |

The tensile strength (TS), yield strength (YS), total elongation (El), hole expansion ratio (λ), ratio (R/t) between the sheet thickness t and the minimum bending radius R, area fractions of the steel micro-structure, as well as the values of sol. Bs/B and sol. Bq/B for the obtained cold-rolled steel sheets were measured by the same methods as in Example 1.

The results of these measurements are shown in Tables 17 and 18. Note that, in the present example the emphasis was placed on strength, and the result was determined as being good in a case where the tensile strength was 1180 MPa or more and the ratio R/t between the sheet thickness t and the minimum bending radius R was 3.5 or less.

In the example embodiments of the present invention in which the chemical composition and the presence state of B satisfied the ranges defined by the present invention, the results showed that the tensile strength was 1180 MPa or more and the value of R/t was 3.5 or less, and the example embodiments thus had high strength and favorable bendability.

On the other hand, in comparative examples in which one of or both of the chemical composition and the presence state of B were outside the ranges defined by the present invention, the results showed that a tensile strength of 1180 MPa or more or favorable bendability was not obtained.

TABLE 17

| Test No. | Steel | Microstructure of surface layer portion (vol. %) | | | | | Microstructure of inner portion (vol. %) | | | | |
|---|---|---|---|---|---|---|---|---|---|---|---|
| | | Vα | VB | VM | VTW/VM | Vγ | Vα | VB | VM | VTM/VM | Vγ |
| 1 | A | 55 | 20 | 19 | 75 | 5 | 0 | 21 | 73 | 75 | 5 |
| 2 | A | 6 | 17 | 72 | 80 | 4 | 0 | 18 | 77 | 85 | 4 |
| 3 | A | 5 | 14 | 76 | 80 | 4 | 0 | 20 | 75 | 80 | 4 |
| 4 | A | 6 | 19 | 70 | 80 | 4 | 0 | 25 | 70 | 80 | 4 |
| 5 | A | 58 | 22 | 15 | 55 | 4 | 37 | 18 | 39 | 55 | 5 |
| 6 | A | 53 | 10 | 36 | 90 | 0 | 0 | 7 | 91 | 95 | 1 |
| 7 | A | 56 | 18 | 21 | 75 | 4 | 0 | 19 | 76 | 85 | 4 |
| 8 | A | 56 | 13 | 17 | 100 | 0 | 0 | 45 | 37 | 100 | 4 |
| 9 | A | 9 | 25 | 61 | 85 | 4 | 0 | 16 | 80 | 80 | 3 |
| 10 | A | 5 | 22 | 70 | 85 | 2 | 0 | 25 | 70 | 90 | 4 |
| 11 | A | 25 | 16 | 54 | 75 | 4 | 0 | 16 | 78 | 80 | 5 |
| 12 | A | 51 | 15 | 30 | 60 | 3 | 0 | 24 | 71 | 60 | 4 |
| 13 | B | 56 | 5 | 36 | 80 | 2 | 0 | 6 | 91 | 85 | 2 |
| 14 | B | 55 | 8 | 33 | 30 | 3 | 0 | 9 | 89 | 30 | 1 |
| 15 | B | 63 | 8 | 26 | 80 | 2 | 15 | 9 | 75 | 85 | 0 |
| 16 | B | 54 | 10 | 33 | 90 | 2 | 0 | 12 | 85 | 85 | 0 |
| 17 | C | 53 | 8 | 36 | 80 | 2 | 0 | 8 | 89 | 85 | 2 |
| 18 | D | 58 | 13 | 21 | 75 | 7 | 0 | 23 | 69 | 70 | 7 |
| 19 | F | 48 | 10 | 39 | 75 | 2 | 0 | 5 | 92 | 80 | 2 |
| 20 | I | 51 | 0 | 33 | 80 | 15 | 0 | 6 | 77 | 85 | 16 |
| 21 | J | 54 | 0 | 34 | 80 | 11 | 0 | 6 | 79 | 85 | 14 |

TABLE 18

| Test No. | Steel | Presence state of B | | | | Mechanical Properties | | | | | |
|---|---|---|---|---|---|---|---|---|---|---|---|
| | | sol. Bs (ppm) | sol. Bs/B | sol. Bq (ppm) | sol. Bq/B | YS (MPa) | TS (MPa) | El (%) | λ (%) | R/t | |
| 1 | A | 3 | 0.15 | 20 | 1.00 | 1034 | 1508 | 9.3 | 36 | 2.0 | Inventive ex. |
| 2 | A | 19 | 0.95* | 20 | 1.00 | 1092 | 1556 | 8.6 | 37 | 4.5 | Comparative |
| 3 | A | 19 | 0.95* | 20 | 1.00 | 1073 | 1521 | 8.8 | 34 | 4.5 | example |
| 4 | A | 19 | 0.95* | 20 | 1.00 | 1081 | 1535 | 8.4 | 39 | 4.5 | |
| 5 | A | 2 | 0.10 | 7 | 0.35* | 765 | 1148 | 12.9 | 25 | 1.0 | |
| 6 | A | 2 | 0.10 | 19 | 0.95 | 1196 | 1502 | 7.8 | 44 | 2.0 | Inventive |
| 7 | A | 3 | 0.15 | 20 | 1.00 | 1077 | 1481 | 8.5 | 38 | 2.0 | example |
| 8 | A | 2 | 0.10 | 19 | 0.95 | 740 | 1198 | 11.6 | 41 | 3.0 | |
| 9 | A | 4 | 0.20 | 19 | 0.95 | 1059 | 1511 | 8.7 | 44 | 3.5 | |
| 10 | A | 3 | 0.15 | 20 | 1.00 | 1030 | 1477 | 9.2 | 36 | 3.5 | |
| 11 | A | 8 | 0.40 | 20 | 1.00 | 1100 | 1537 | 8.2 | 40 | 3.0 | |
| 12 | A | 3 | 0.15 | 20 | 1.00 | 1028 | 1493 | 9.5 | 36 | 2.0 | |
| 13 | B | 3 | 0.14 | 21 | 0.95 | 1086 | 1519 | 8.2 | 44 | 2.0 | |
| 14 | B | 3 | 0.14 | 20 | 0.91 | 1061 | 1596 | 8.0 | 29 | 3.5 | |
| 15 | B | 2 | 0.09 | 20 | 0.91 | 1006 | 1494 | 10.3 | 26 | 2.5 | |
| 16 | B | 3 | 0.14 | 21 | 0.95 | 1073 | 1514 | 8.8 | 34 | 2.0 | |
| 17 | C | 3 | 0.14 | 20 | 0.95 | 1017 | 1321 | 8.4 | 48 | 2.0 | |
| 18 | D | 3 | 0.15 | 19 | 0.95 | 1033 | 1476 | 10.8 | 31 | 2.0 | |
| 19 | F | 2 | 0.10 | 20 | 1.00 | 1071 | 1488 | 9.2 | 36 | 2.0 | |
| 20 | I | 1 | 0.05 | 19 | 0.95 | 1108 | 1505 | 17.9 | 24 | 2.0 | |
| 21 | J | 2 | 0.09 | 21 | 0.95 | 1158 | 1496 | 16.5 | 30 | 2.0 | |

*indicates that conditions do not satisfy those defined by the present invention.

INDUSTRIAL APPLICABILITY

According to the present invention, a high-strength cold-rolled steel sheet, a high-strength hot-dip galvanized steel sheet, and a high-strength galvannealed steel sheet that are excellent in bendability can be obtained.

The invention claimed is:

1. A cold-rolled steel sheet, having a chemical composition consisting of, by mass %,
C: 0.050 to 0.40%,
Si: 0.01 to 3.0%,
Mn: 1.0 to 5.0%,
sol. Al: 0.001 to 1.0%,
Ti: 0.005 to 0.20%,
B: 0.0005 to 0.010%,
P: 0.1% or less,
S: 0.01% or less,
O: 0.1% or less,
N: 0.01% or less,
Cr: 0 to 1.0%,
Mo: 0 to 1.0%,
Ni: 0 to 1.0%,
Cu: 0 to 1.0%,
Sn: 0 to 0.50%,
Nb: 0 to 0.20%,
V: 0 to 0.50%,
W: 0 to 0.50%,
Ca: 0 to 0.01%,
Mg: 0 to 0.01%,
Bi: 0 to 0.01%,
Sb: 0 to 0.10%,
Zr: 0 to 0.01%,
REM: 0 to 0.01%, and
the balance: Fe and impurities,
and satisfying formula (i) and formula (ii) below:

$$\text{sol. Bs/B} \leq 0.50 \quad (i)$$

$$\text{sol. Bq/B} > 0.50 \quad (ii)$$

where, the meaning of each symbol in the above formulas is as follows:
B: B content (mass %) contained in steel sheet;
sol. Bs: B content (mass %) present as a solid solution from a surface down to a depth of 30 μm of the steel sheet wherein the value of sol. Bs s determined calculating the B amount consumed as a precipitate by measuring the mass of boride by an electrolytic extraction residue method to a depth of 30 μm without grinding the steel sheet surface, and thereafter deducting the calculated B amount from the B content contained in the steel; and
sol. Bq: B content (mass %) present as a solid solution at a position of ¼ thickness of the steel sheet, wherein the value of sol. Bq is determined by calculating the B amount consumed as a precipitate by measuring the mass of boride by an electrolytic extraction residue method by mechanically grinding the steel sheet to the position of ¼ thickness, and thereafter performing electrolytic extraction to a depth of 30 μm, and thereafter deducting the calculated B amount from the B content contained in the steel.

2. The cold-rolled steel sheet according to claim 1, wherein the chemical composition contains, by mass %, one or more elements selected from:
Cr: 0.001 to 1.0%,
Mo: 0.001 to 1.0%,
Ni: 0.001 to 1.0%,
Cu: 0.001 to 1.0%,
Sn: 0.001 to 0.50%,
Nb: 0.001 to 0.20%,
V: 0.001 to 0.50%,
W: 0.001 to 0.50%,
Ca: 0.0001 to 0.01%,
Mg: 0.0001 to 0.01%,
BI: 0.0001 to 0.01%,
Sb: 0.0001 to 0.10%,
Zr: 0.0001 to 0.01%, and
REM: 0.0001 to 0.01%.

3. The cold-rolled steel sheet according to claim 1, wherein:
a steel micro-structure at a position from a surface down to a depth of 30 μm of the steel sheet is, in area %:
polygonal ferrite: 10 to 95%, and
the balance: one or more kinds selected from martensite, bainite and retained austenite,
with a proportion of tempered martensite to the martensite overall being 50% or more; and
a steel micro-structure at a position of ¼ thickness of the steel sheet is, in area %:
polygonal ferrite: 60% or less, and
the balance: one or more kinds selected from martensite, bainite and retained austenite,
with a proportion of tempered martensite to the martensite overall being 50% or more.

4. The cold-rolled steel sheet according to claim 3, wherein:
a steel micro-structure at a position from the surface down to the depth of 30 μm of the steel sheet is, in area %:
polygonal ferrite: 30 to 95%; and
a steel micro-structure at the position of ¼ thickness of the steel sheet is, in area %,
polygonal ferrite: 10 to 60%.

5. The cold-rolled steel sheet according to claim 4, wherein:
a tensile strength is 980 MPa or more, and a ratio R/t between a sheet thickness t and a minimum bending radius R is 2.5 or less.

6. The cold-rolled steel sheet according to claim 3, wherein:
a steel micro-structure at a position from the surface down to the depth of 30 μm of the steel sheet is, in area %:
polygonal ferrite: 10 to 80%, and
a steel micro-structure at the position of ¼ thickness of the steel sheet is, in area %:
polygonal ferrite: 20% or less,
martensite: 50% or more,
bainite: 40% or less, and
retained austenite: 20% or less.

7. The high strength cold-rolled steel sheet according to claim 6, wherein:
a tensile strength is 1180 MPa or more, and a ratio R/t between a sheet thickness t and a minimum bending radius R is 3.5 or less.

8. A high-strength hot-dip galvanized steel sheet that has a hot-dip galvanized layer on a surface of the cold-rolled steel sheet according to claim 1.

9. A high-strength galvannealed steel sheet that has a galvannealed layer on a surface of the cold-rolled steel sheet according to claim 1.

* * * * *

UNITED STATES PATENT AND TRADEMARK OFFICE
CERTIFICATE OF CORRECTION

PATENT NO.         : 10,724,114 B2
APPLICATION NO.    : 15/740055
DATED              : July 28, 2020
INVENTOR(S)        : Yokoyama et al.

Page 1 of 1

It is certified that error appears in the above-identified patent and that said Letters Patent is hereby corrected as shown below:

On the Title Page

"(87) PCT Pub. Date: May 1, 2017"
Should read:
"(87) PCT Pub. Date: Jan. 5, 2017"

In the Claims

Column 43, Line 46:
"sheet wherein the value of sol. Bs s determined calcu-"
Should read:
"sheet wherein the value of sol. Bs is determined by calcu-"

Column 44, Line 11:
"BI: 0.0001 to 0.01%,"
Should read:
"Bi: 0.0001 to 0.01%,"

Column 44, Line 54:
"7. The high strength cold-rolled steel sheet according to"
Should read:
"7. The cold-rolled steel sheet according to"

Signed and Sealed this
Twenty-fourth Day of November, 2020

Andrei Iancu
*Director of the United States Patent and Trademark Office*